US012585620B1

(12) United States Patent     (10) Patent No.:   US 12,585,620 B1

Garcia     (45) Date of Patent:    Mar. 24, 2026

(54) NUMERICAL TIME SERIES ANALYSIS AND DATA SIMPLIFICATION SYSTEM AND PROCESSES

(71) Applicant: Eduardo Garcia, Corona, CA (US)

(72) Inventor: Eduardo Garcia, Corona, CA (US)

( * ) Notice: Subject to any disclaimer, the term of this patent is extended or adjusted under 35 U.S.C. 154(b) by 0 days.

(21) Appl. No.: 18/409,759

(22) Filed: Jan. 10, 2024

Related U.S. Application Data

(60) Provisional application No. 63/438,008, filed on Jan. 10, 2023.

(51) Int. Cl.
*G06F 16/18*     (2019.01)
*G06F 16/11*     (2019.01)
*G06F 16/16*     (2019.01)

(52) U.S. Cl.
CPC ........ *G06F 16/1805* (2019.01); *G06F 16/116* (2019.01); *G06F 16/168* (2019.01)

(58) Field of Classification Search
CPC .. G06F 16/1805; G06F 16/168; G06F 16/116; G06F 16/16; G06F 16/11
See application file for complete search history.

(56) References Cited

U.S. PATENT DOCUMENTS

| | | | |
|---|---|---|---|
| 2002/0090934 A1* | 7/2002 | Mitchelmore .......... | H04L 67/10 |
| | | | 455/412.2 |
| 2008/0016108 A1* | 1/2008 | Aspinall ............ | G06Q 30/0633 |
| | | | 707/999.102 |
| 2016/0307598 A1* | 10/2016 | Johns ..................... | G11B 27/10 |
| 2019/0026047 A1* | 1/2019 | Balko .................. | G06F 3/0643 |
| 2021/0017853 A1* | 1/2021 | Iriarte Lopez ......... | E21B 47/06 |
| 2021/0216678 A1* | 7/2021 | Wang ..................... | G06F 30/00 |

* cited by examiner

*Primary Examiner* — Amy Ng
*Assistant Examiner* — Dustin D Eyers
(74) *Attorney, Agent, or Firm* — Plager Schack LLP; Mark H. Plager; Stephen Hallberg

(57)        ABSTRACT

A numerical time series analysis and data simplification system and a software-implemented numerical time series analysis and data simplification process are disclosed. The numerical time series analysis and data simplification system and process provide several functions including channel math, signal filtering, and concatenation functions. The numerical time series analysis and data simplification system and process focus on a very specific engineering problem space and provide a generic solution to the likely variations of the problem space.

8 Claims, 16 Drawing Sheets

200

600

1000

1100

1400

NUMERICAL TIME SERIES ANALYSIS AND DATA SIMPLIFICATION SYSTEM AND PROCESSES

This application claims benefit to U.S. Provisional Patent Application 63/438,008, entitled "A NUMERICAL TIME SERIES ANALYSIS SYSTEM AND SOFTWARE-IMPLEMENTED numerical time series analysis and data simplification process," filed Jan. 10, 2023. The U.S. Provisional Patent Application 63/438,008 is incorporated herein by reference.

BACKGROUND

Embodiments of the invention described in this specification relate generally to numerical time series of data analysis systems, and more particularly, to a numerical time series analysis and data simplification system and a software-implemented numerical time series analysis and data simplification process.

Viewing and analyzing very large scale numerical time series data streams quickly and efficiently is not readily available through conventional means. Gaps in data analysis capabilities continue to persist throughout multiple industries. This is evident among several existing systems and mechanisms which either apply (only) to very specific file types (very specialized) or are designed to deal with a very broad range of scenarios (very customizable) that make the data analysis inefficient, both of which require significant resources to take a user's data from a file (or database) to something viewable and understandable.

Some of the existing systems also require knowledge of a programming language and mathematical functions to perform. Additionally, most of the existing systems are limited in features and/or limited in data size. For instance, some of the existing systems and mechanisms commonly utilized include specialized custom software, open-source data analysis software languages, and spreadsheet applications. While these existing options have certain benefits, they also each have their own drawbacks. Specialized custom software involves development and maintenance—neither of which is endowed with a guarantee of resulting software that is fit for purpose and typically involves significant costs. Open-source software languages provide significant power to the user but can have a steep learning curve. Thus, the user may not be able to develop a solution that is both accurate and efficient. Spreadsheet applications is another widely used tool. While there is commonly a certain level of understanding in the use of spreadsheets, they are inherently limited in key ways—in particular, having significant data size and visualization limitations. Furthermore, reliance on general computing devices to handle the loading and processing of data is often a mistake due to the processing time involved, memory limitations of such computing devices, and the management of data by such computing devices in connection with numerical methods and algorithms.

Therefore, what is needed is a way to close some of the gaps in the data analysis capabilities of the existing systems by simplifying data analysis and visualization of numerical time series data, which are typically obtained from analog data acquisition (DAQ) systems, and by providing a variety of functional tools for data analysis and visualization as well as ways to handle very large data sets or files, in ways that can be focused on a very specific engineering problem space while providing a generic solution that broadly covers likely variations of the problem space.

BRIEF DESCRIPTION

A novel numerical time series analysis and data simplification system and a novel software-implemented numerical time series analysis and data simplification process are disclosed for simplifying data analysis and visualization of numerical time series data, typically from analog data acquisition (DAQ) systems. In some embodiments, the numerical time series analysis and data simplification system and the software-implemented numerical time series analysis and data simplification process smartly reads and packages large data sets and provides a plurality of numerical time series data analysis functions comprising channel-to-channel math, signal filtering, and concatenation functions. In some embodiments, the numerical time series analysis and data simplification system and the software-implemented numerical time series analysis and data simplification process provide a feature that controls the flow of data ingestion. In some embodiments, the numerical time series analysis and data simplification system and the software-implemented numerical time series analysis and data simplification process provide a plurality of functions for signal conditioning, compression of files and data sets, concatenation of files and data sets, segmentation and/or splitting of files and data sets, and other types of file/data manipulation. In some embodiments, the numerical time series analysis and data simplification system and the software-implemented numerical time series analysis and data simplification process are also configured to perform waveform modeling.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Figure 1:
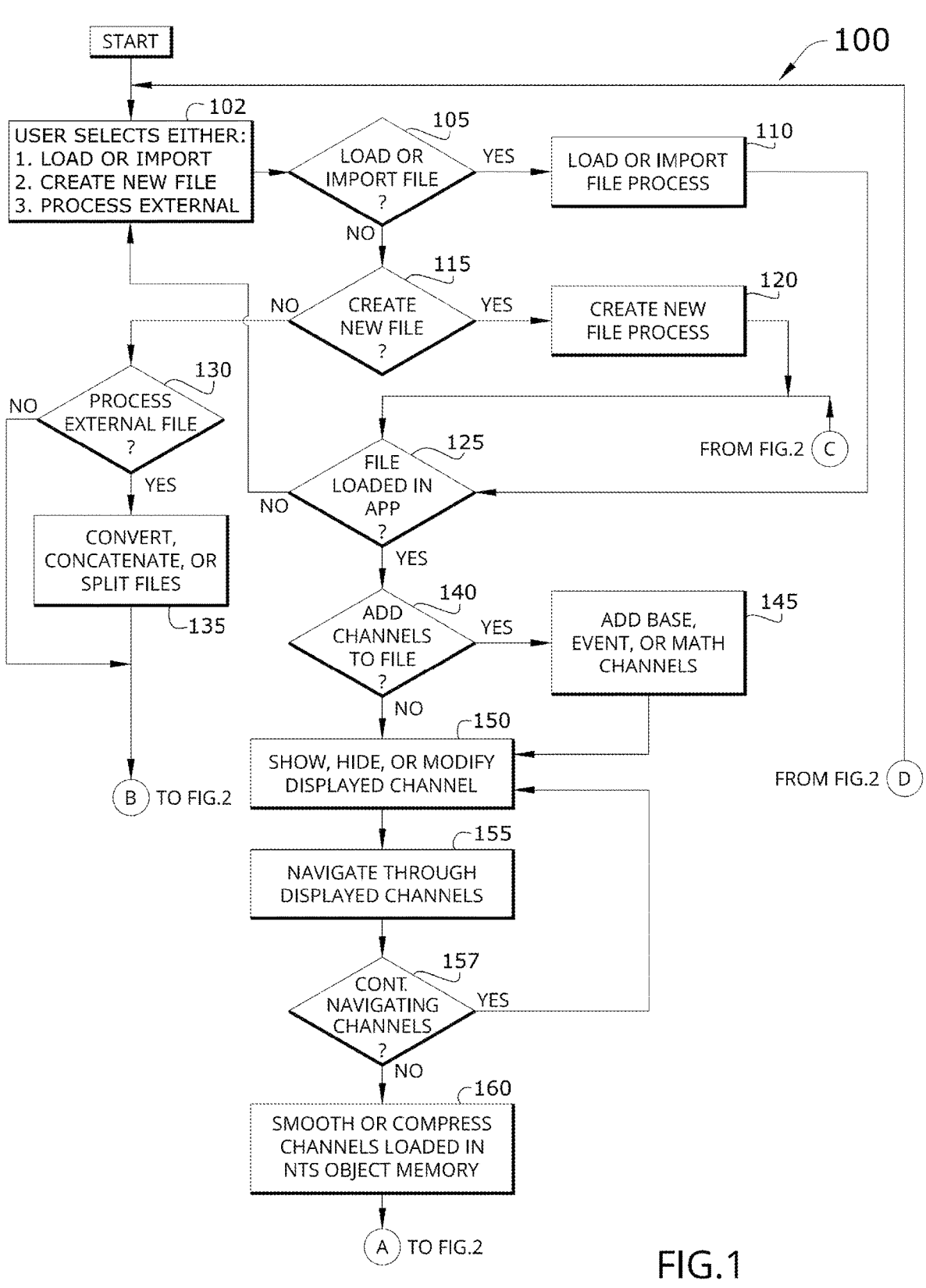

Having thus described the invention in general terms, reference is now made to the accompanying drawings, which are not necessarily drawn to scale, and which show different views of different example embodiments, and wherein:

FIG. 1 conceptually illustrates a high-level numerical time series analysis and data simplification process in some embodiments for simplifying data analysis and visualization of numerical time series data from analog DAQ systems.

Figure 2:
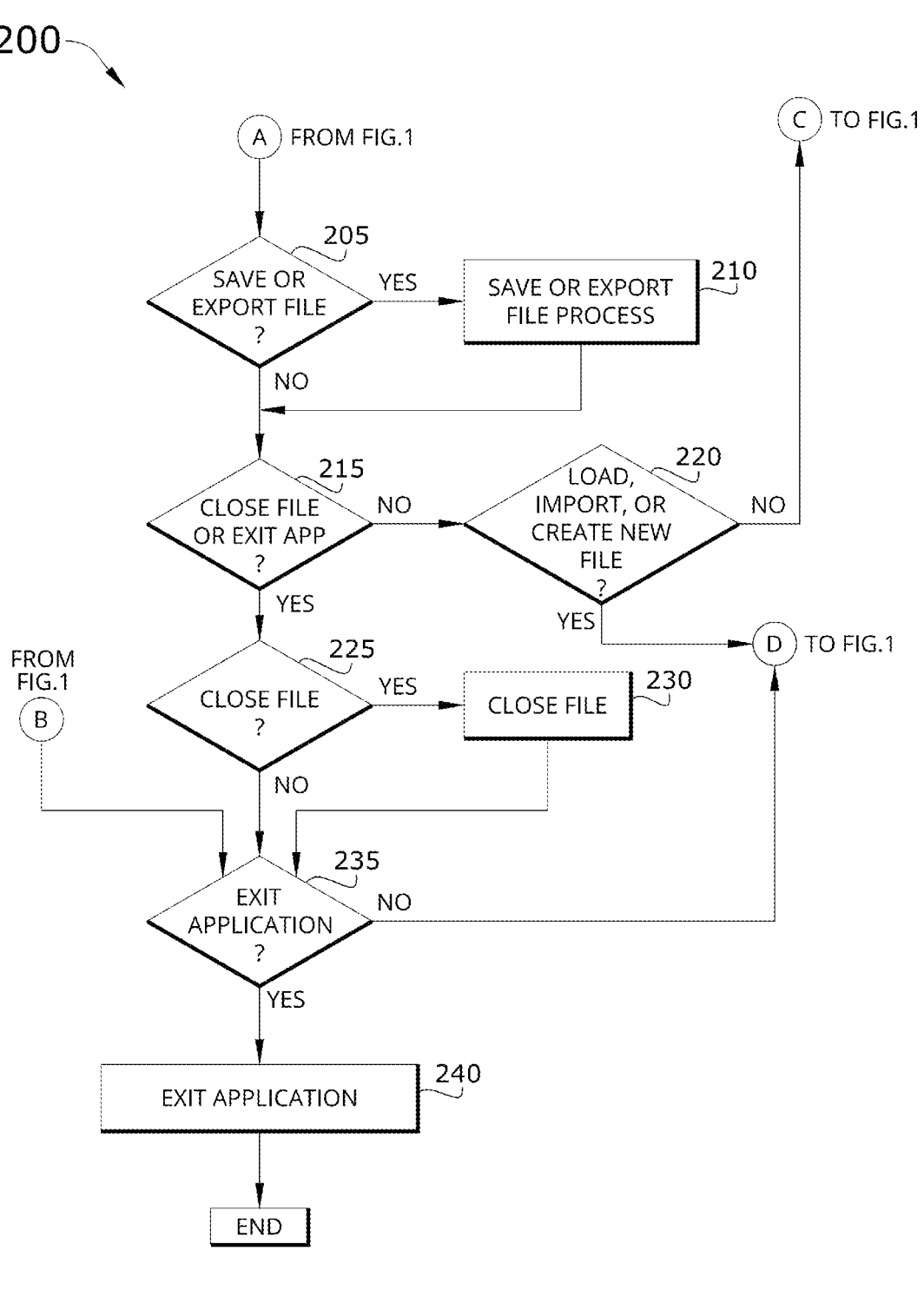

FIG. 2 conceptually illustrates a continuation of the high-level numerical time series analysis and data simplification process of FIG. 1.

Figure 3:
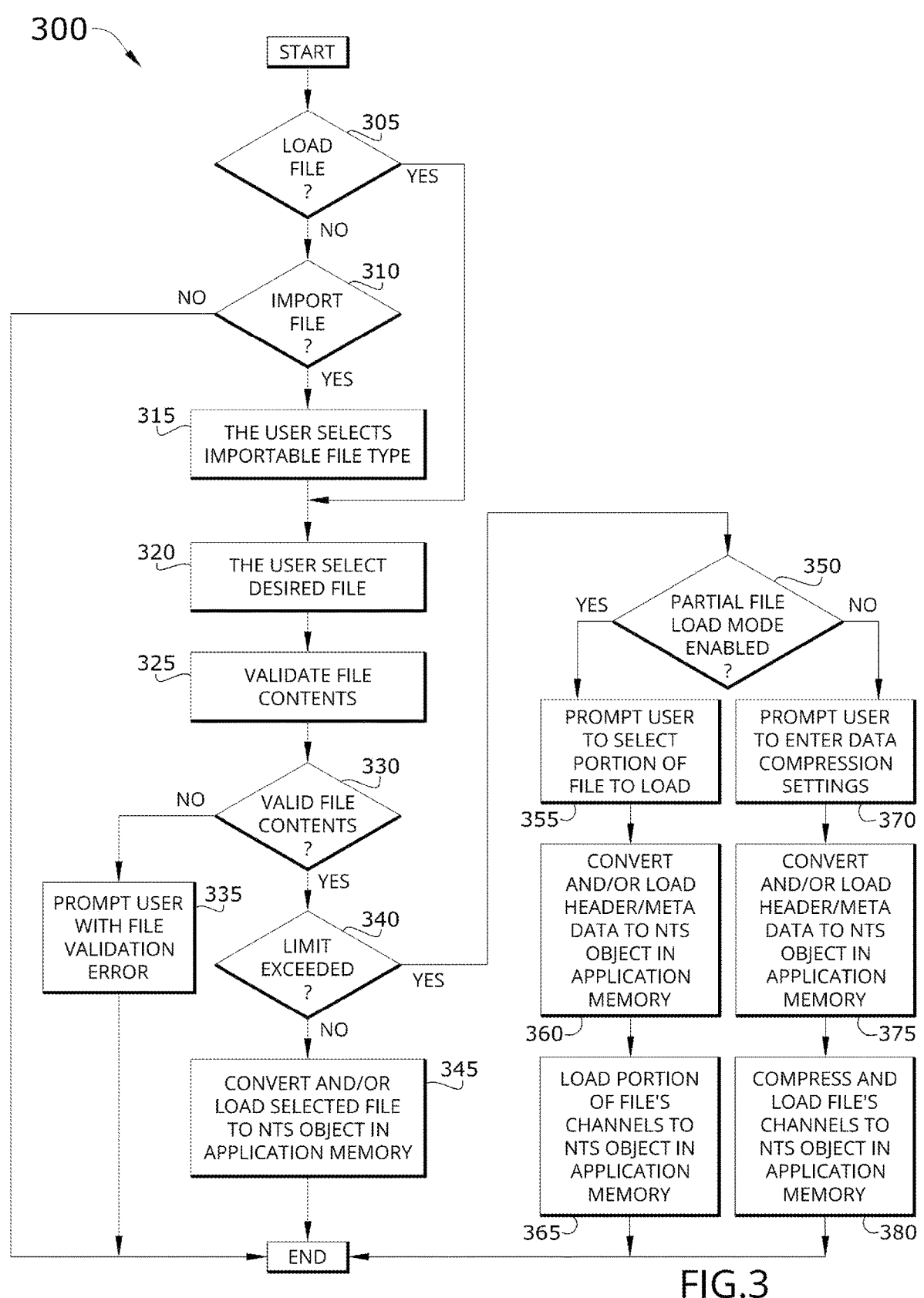

FIG. 3 conceptually illustrates a process for loading a file to a numerical time series (NTS) object in application memory in some embodiments.

Figure 4:
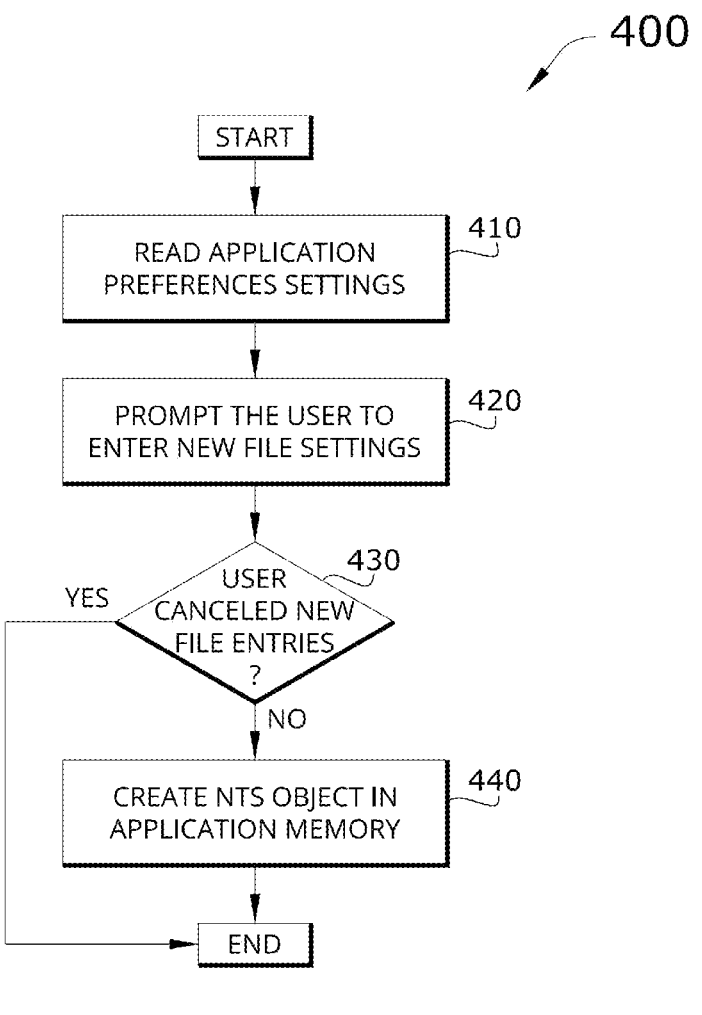

FIG. 4 conceptually illustrates a process for creating a new file in some embodiments.

Figure 5:
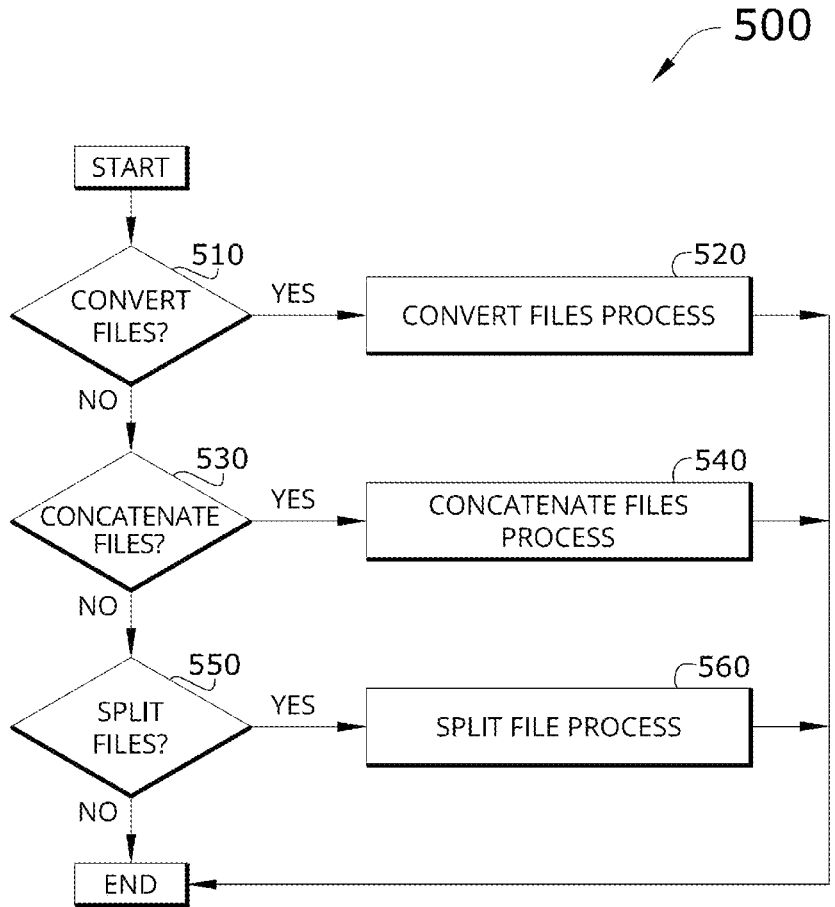

FIG. 5 conceptually illustrates an external file operations process for converting, concatenating, or splitting external files in some embodiments.

Figure 6:
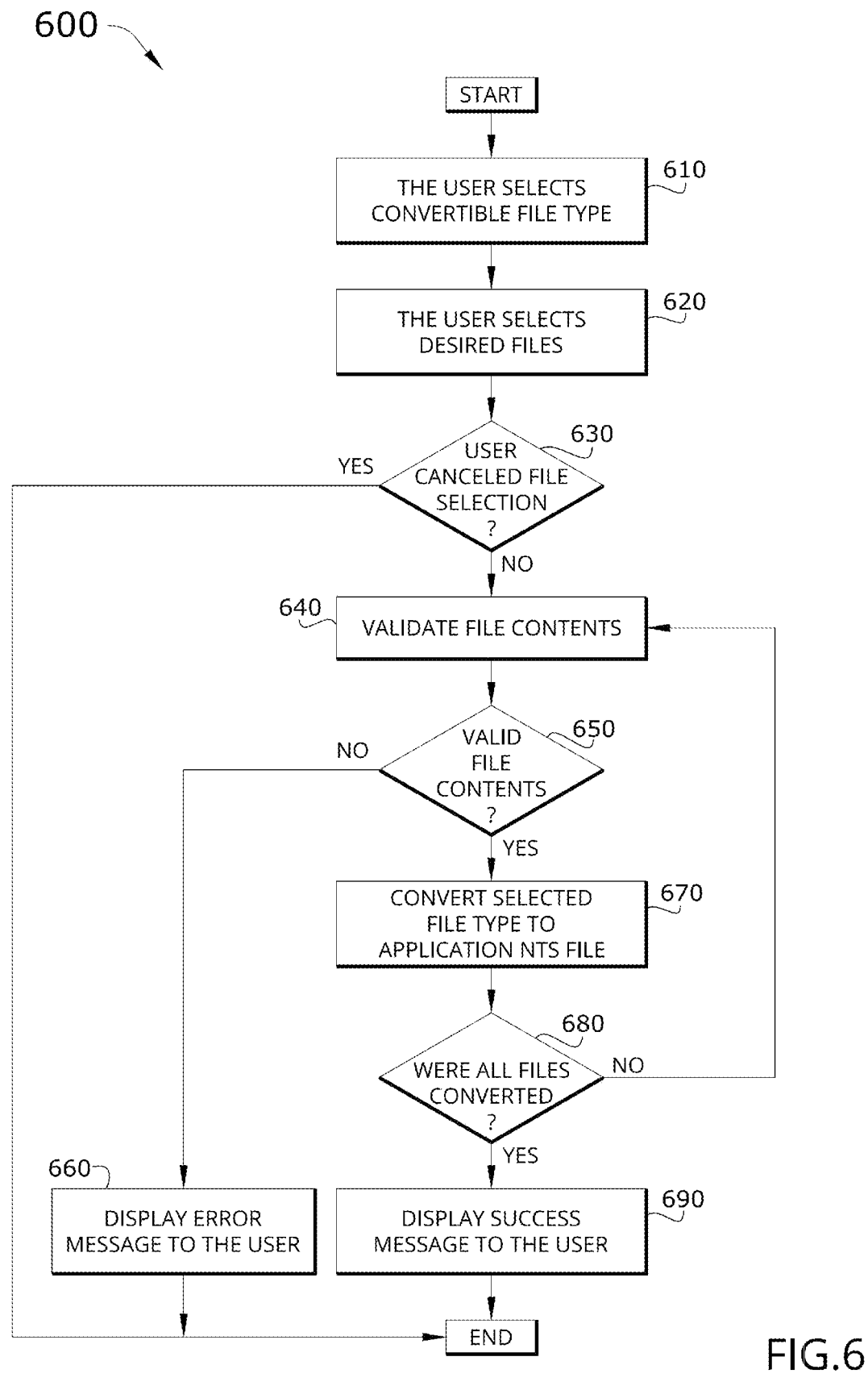

FIG. 6 conceptually illustrates a convert files process in some embodiments.

Figure 7:
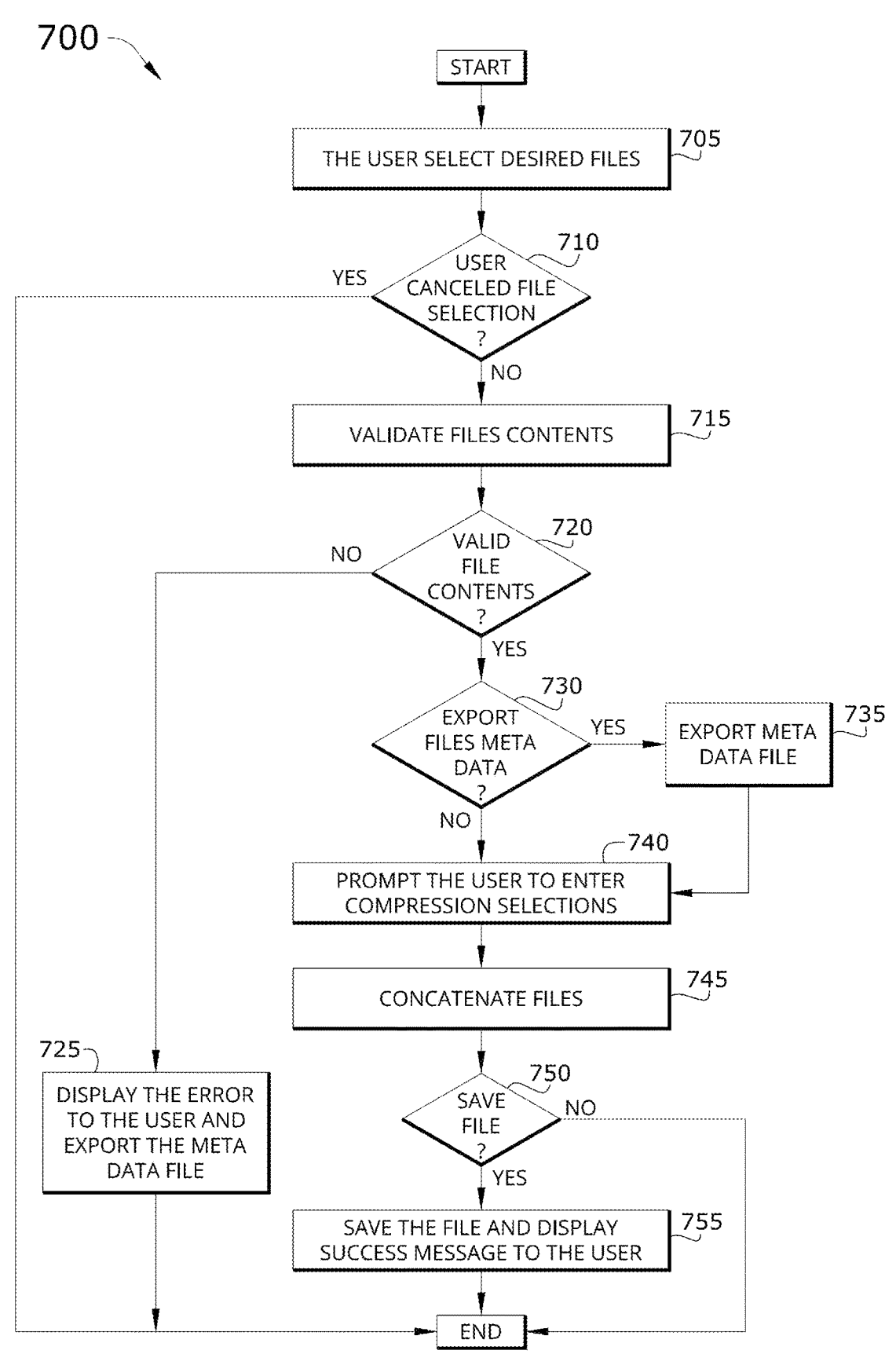

FIG. 7 conceptually illustrates a concatenate files process in some embodiments.

Figure 8:
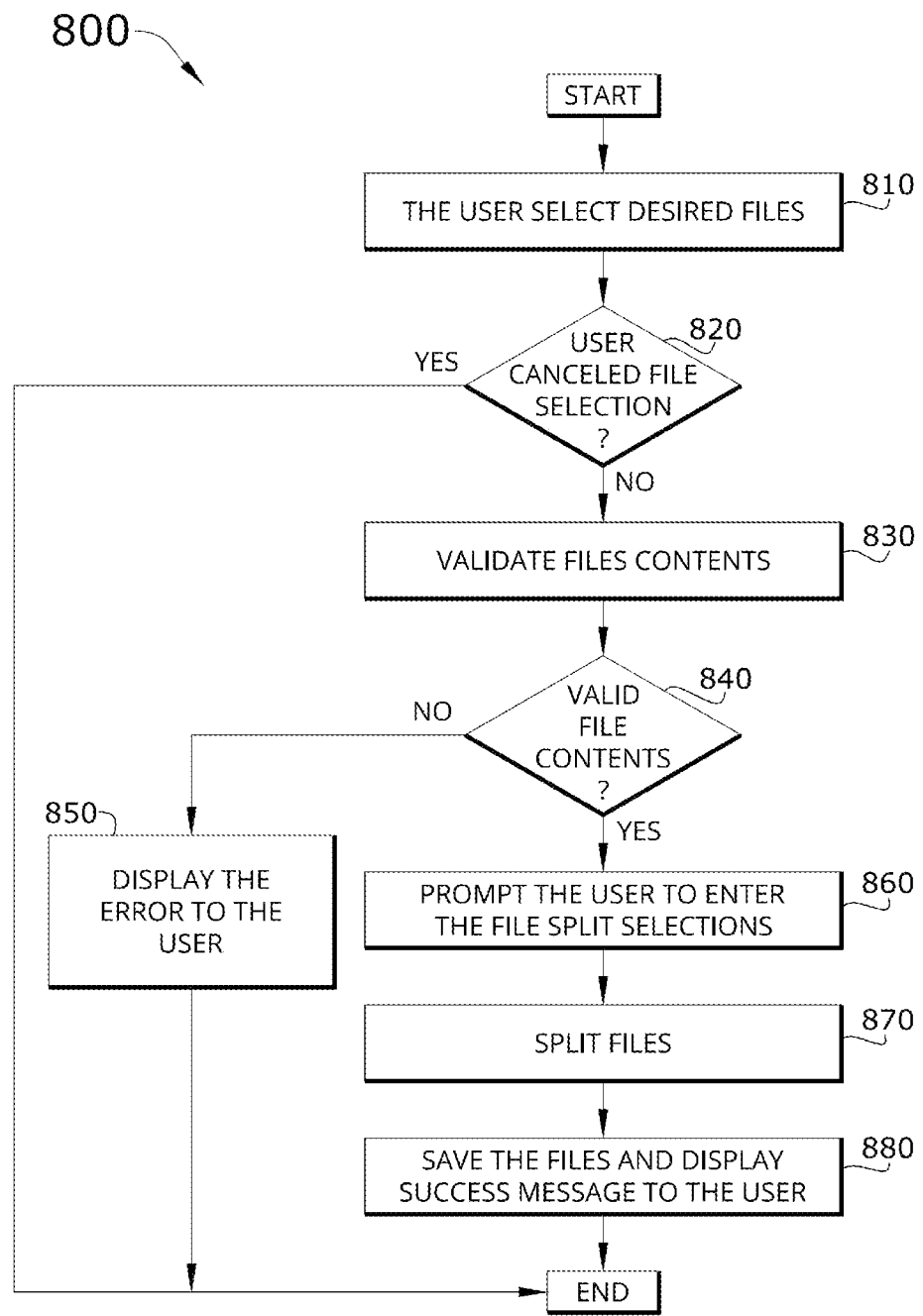

FIG. 8 conceptually illustrates a split files process in some embodiments.

Figure 9:
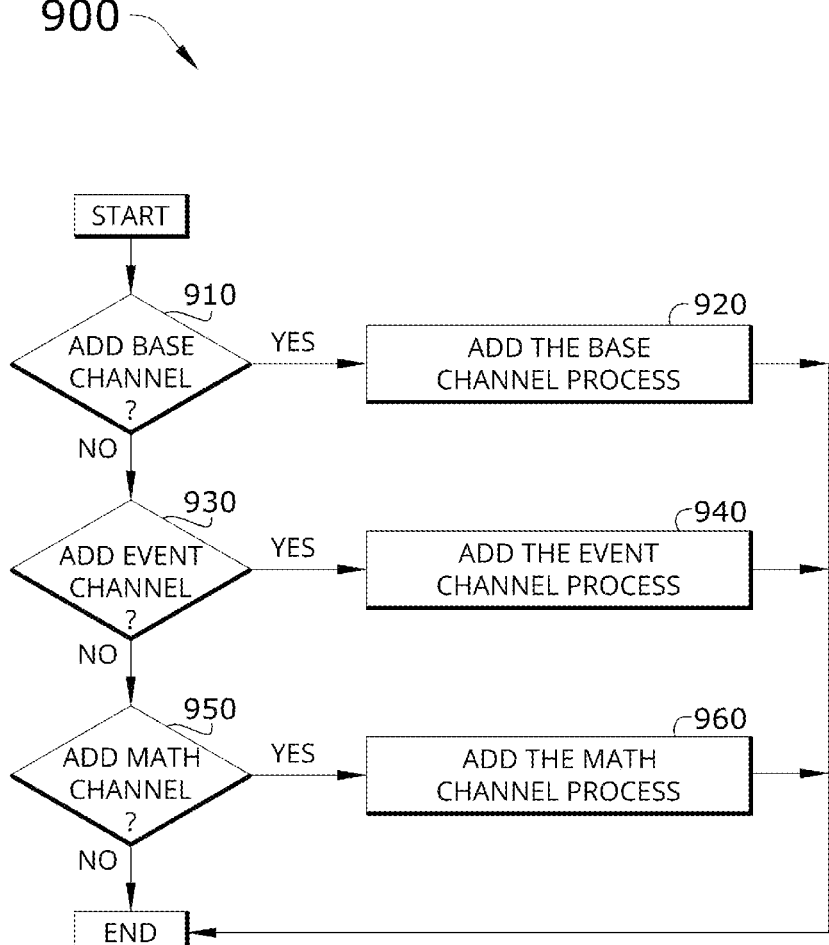

FIG. 9 conceptually illustrates an add channels process in some embodiments.

Figure 10:
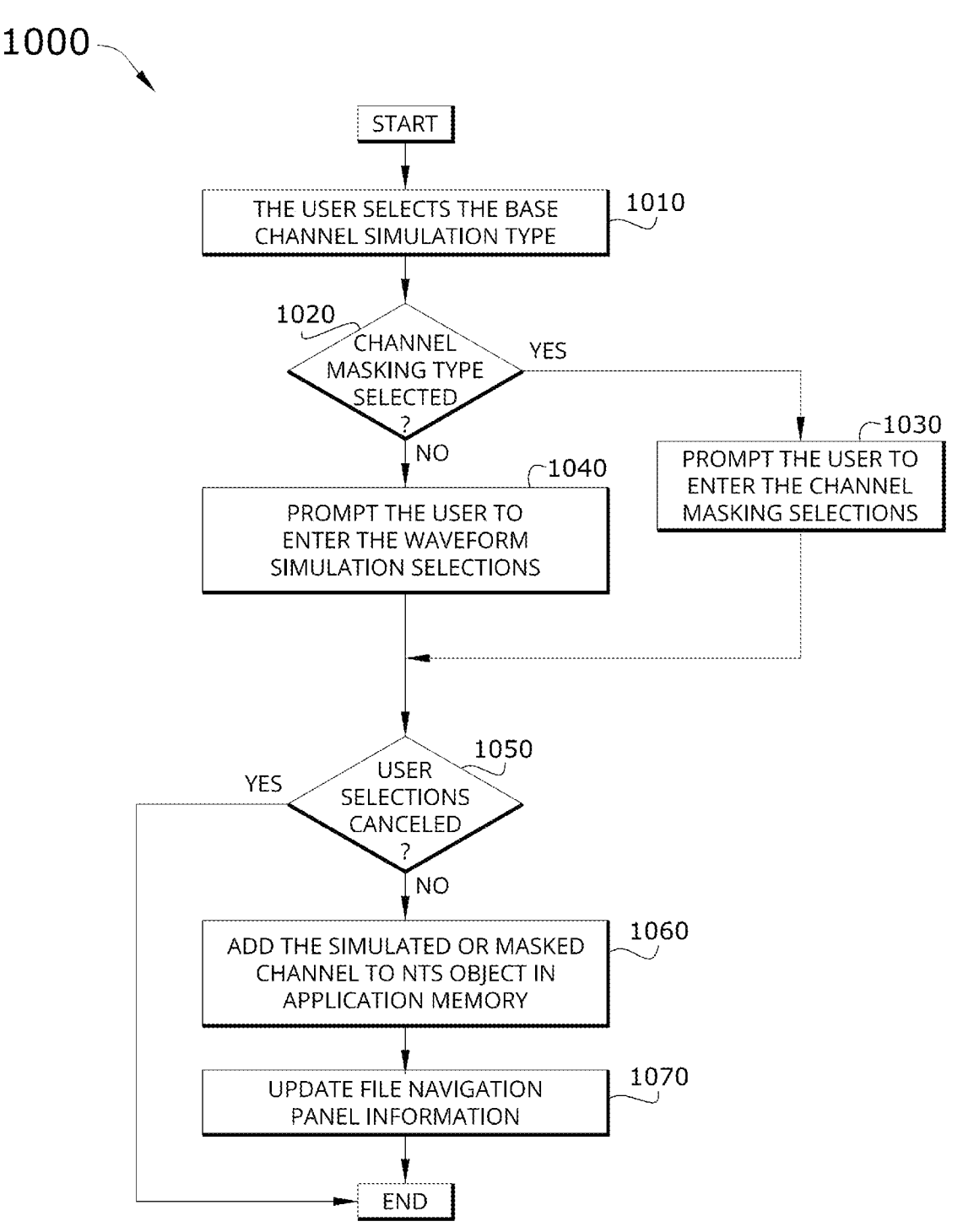

FIG. 10 conceptually illustrates a process for adding a base channel in some embodiments.

Figure 11:
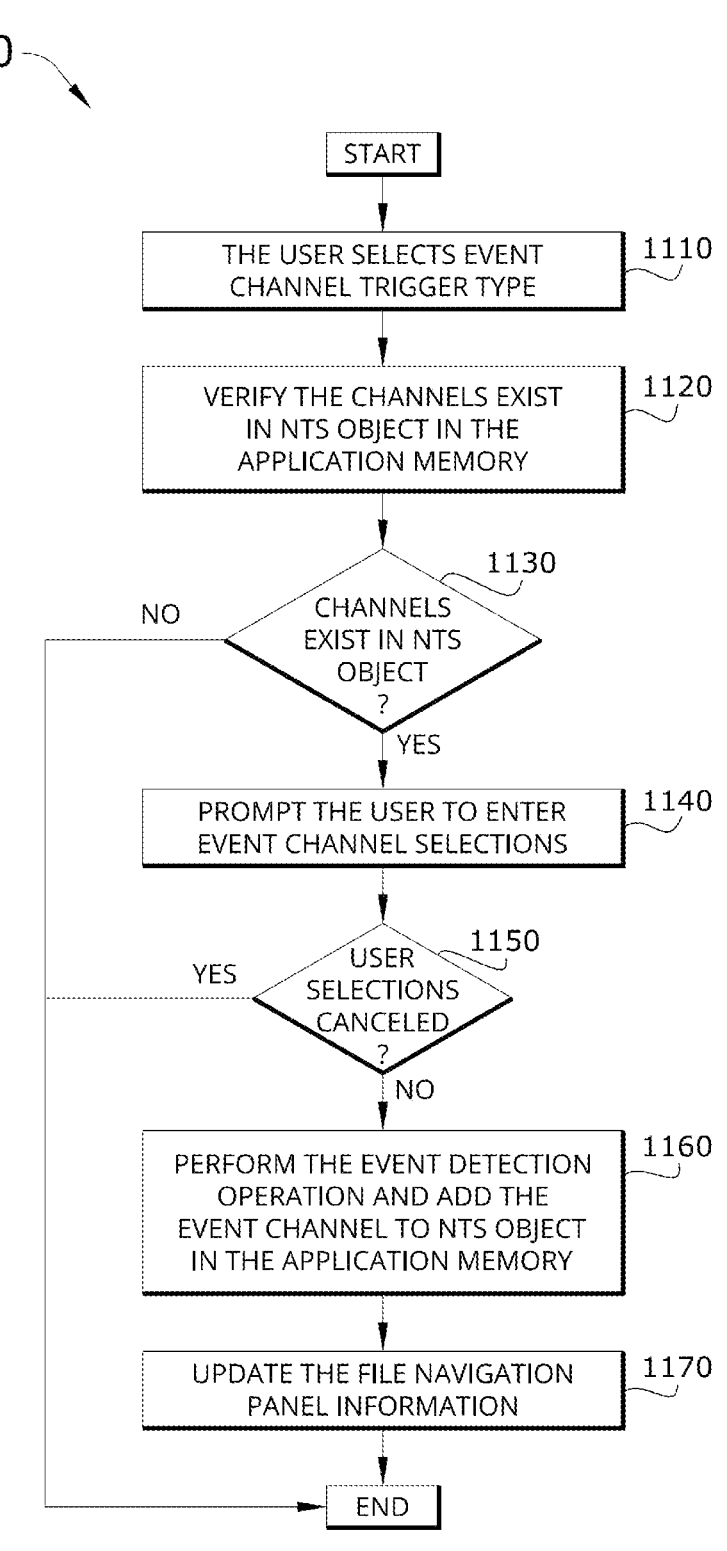

FIG. 11 conceptually illustrates a process for adding an event channel in some embodiments.

Figure 12:
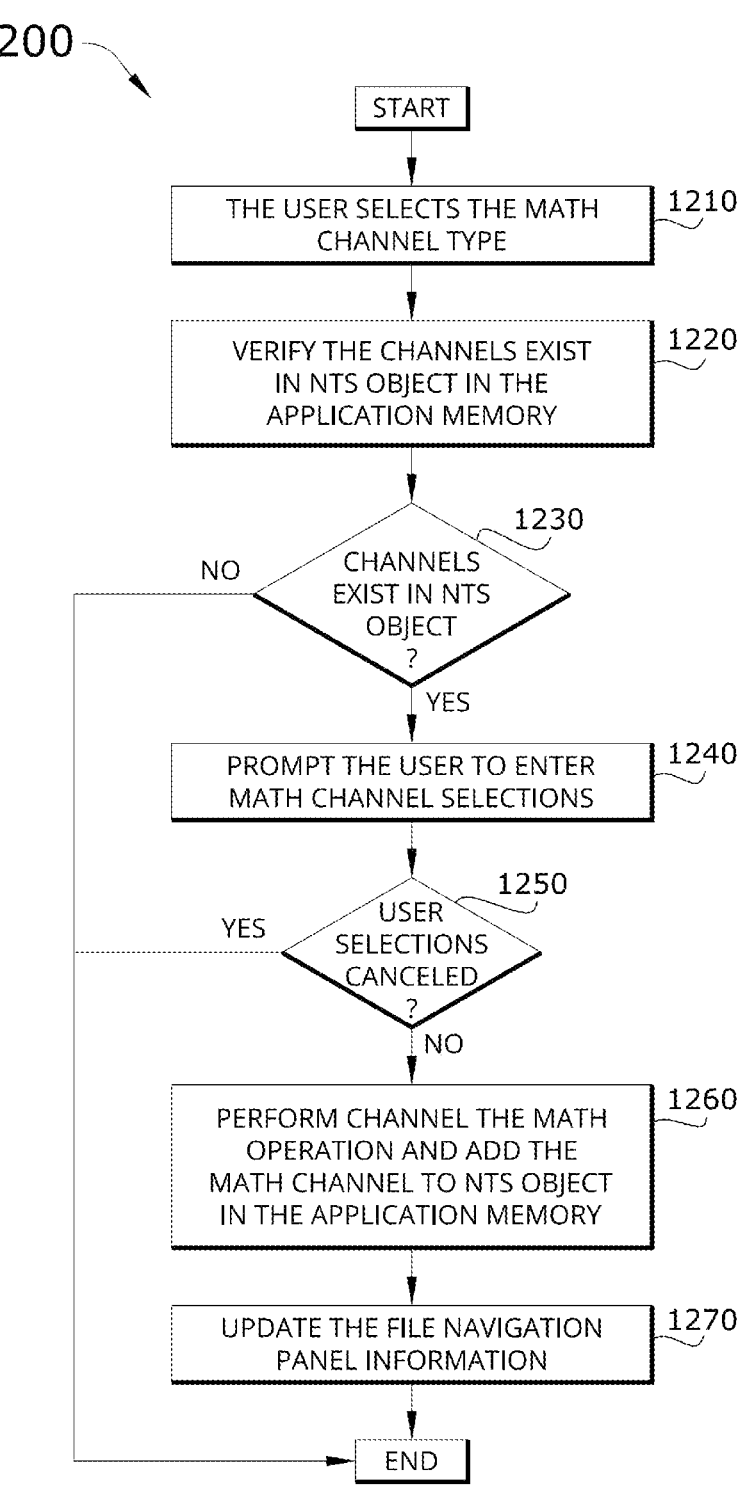

FIG. 12 conceptually illustrates a process for adding a math channel in some embodiments.

Figure 13:
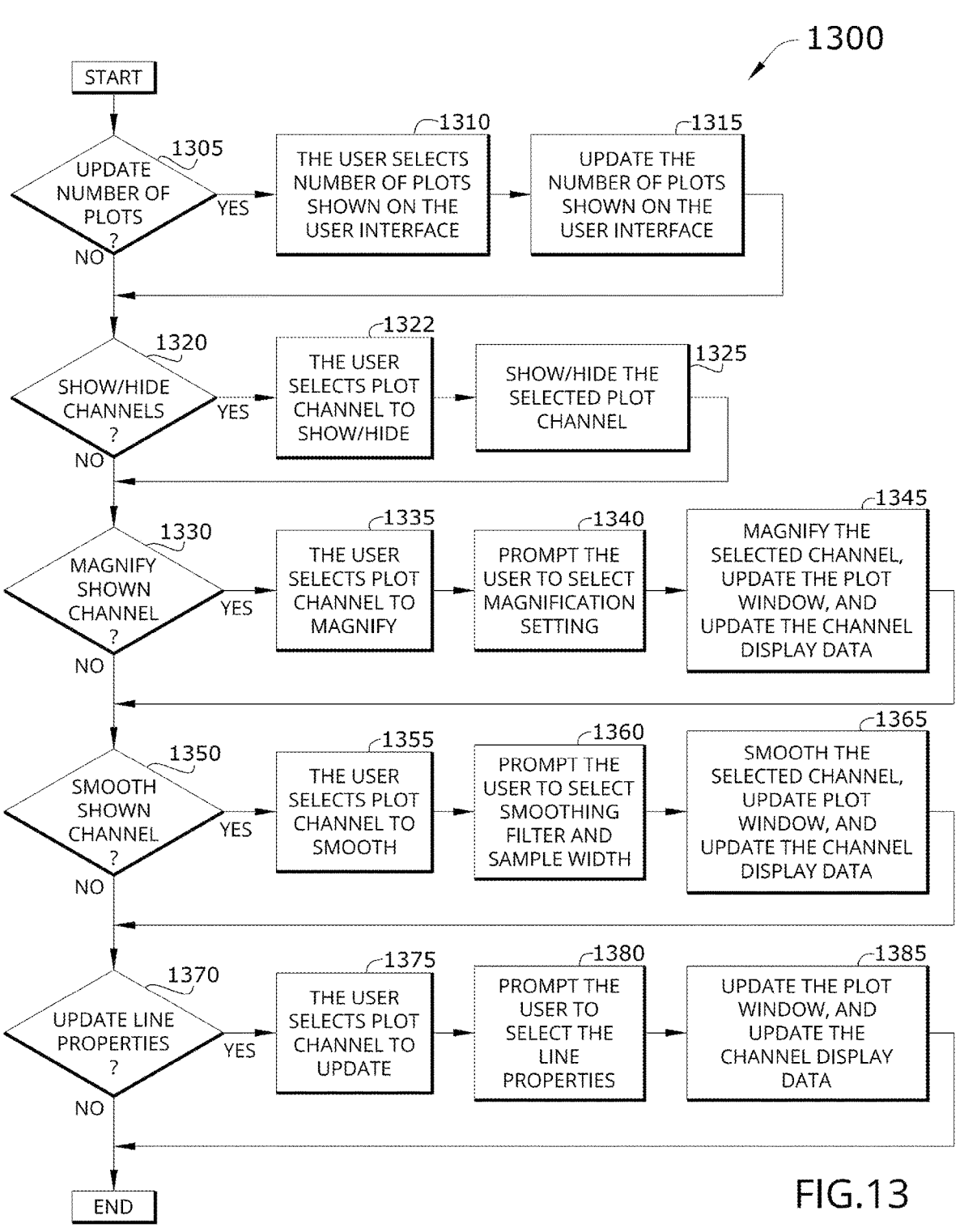

FIG. 13 conceptually illustrates a process for showing, hiding, or modifying a displayed channel in some embodiments.

Figure 14:
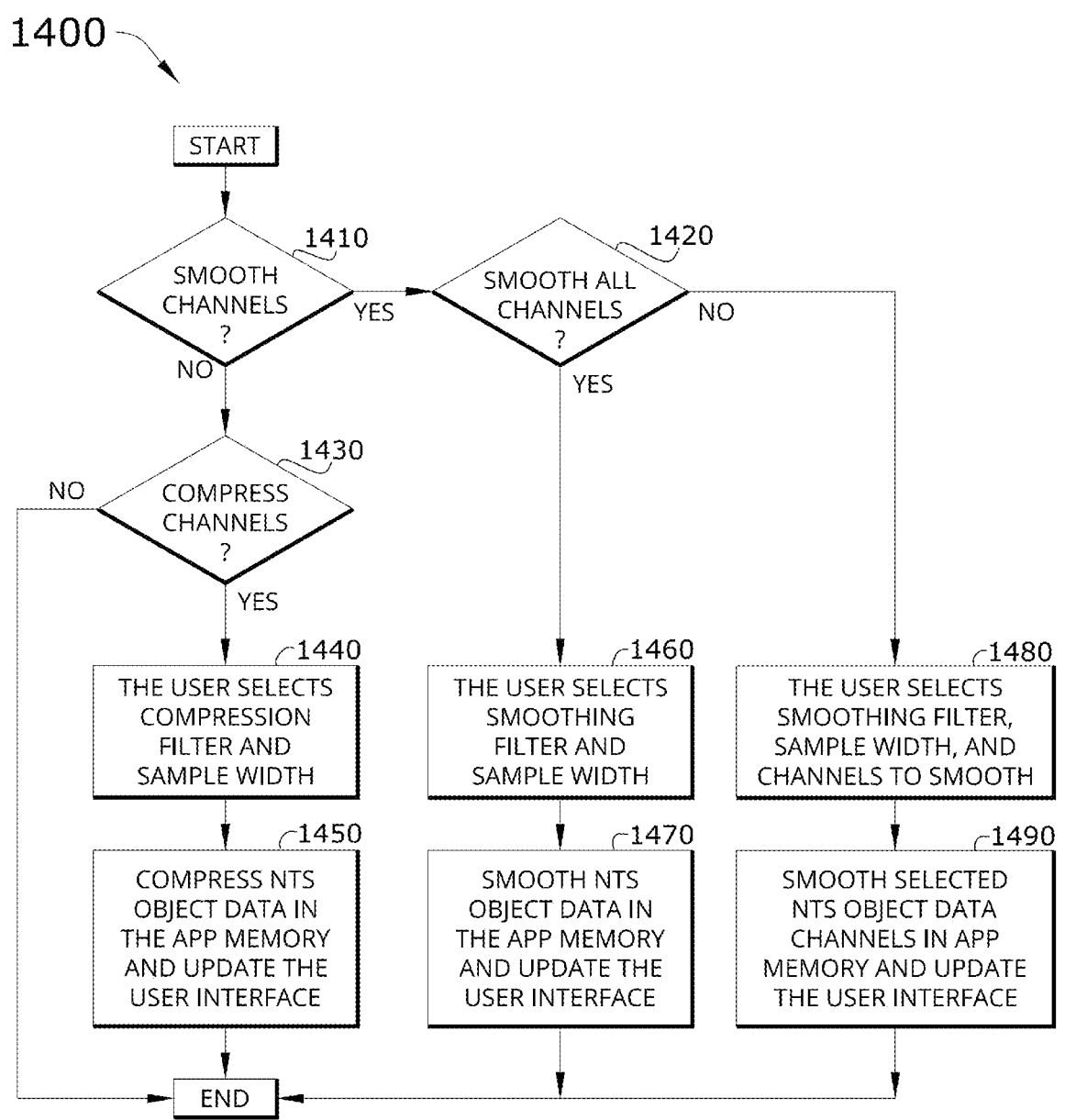

FIG. 14 conceptually illustrates a process for smoothing or compressing channels loaded in NTS object memory in some embodiments.

Figure 15:
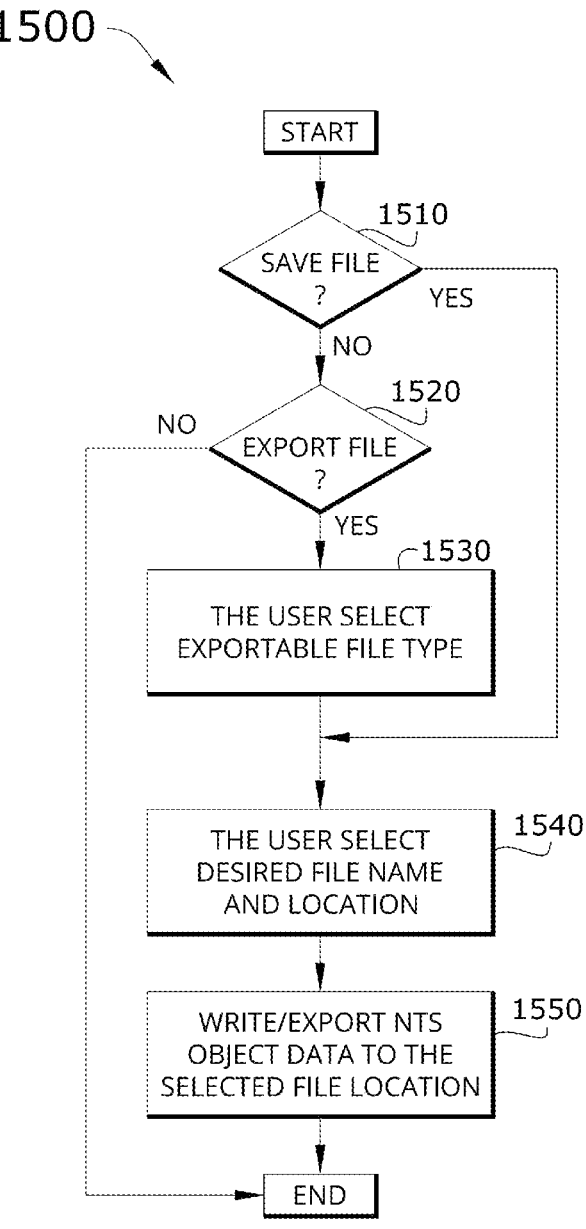

FIG. 15 conceptually illustrates a process for saving or exporting a file in some embodiments.

Figure 16:
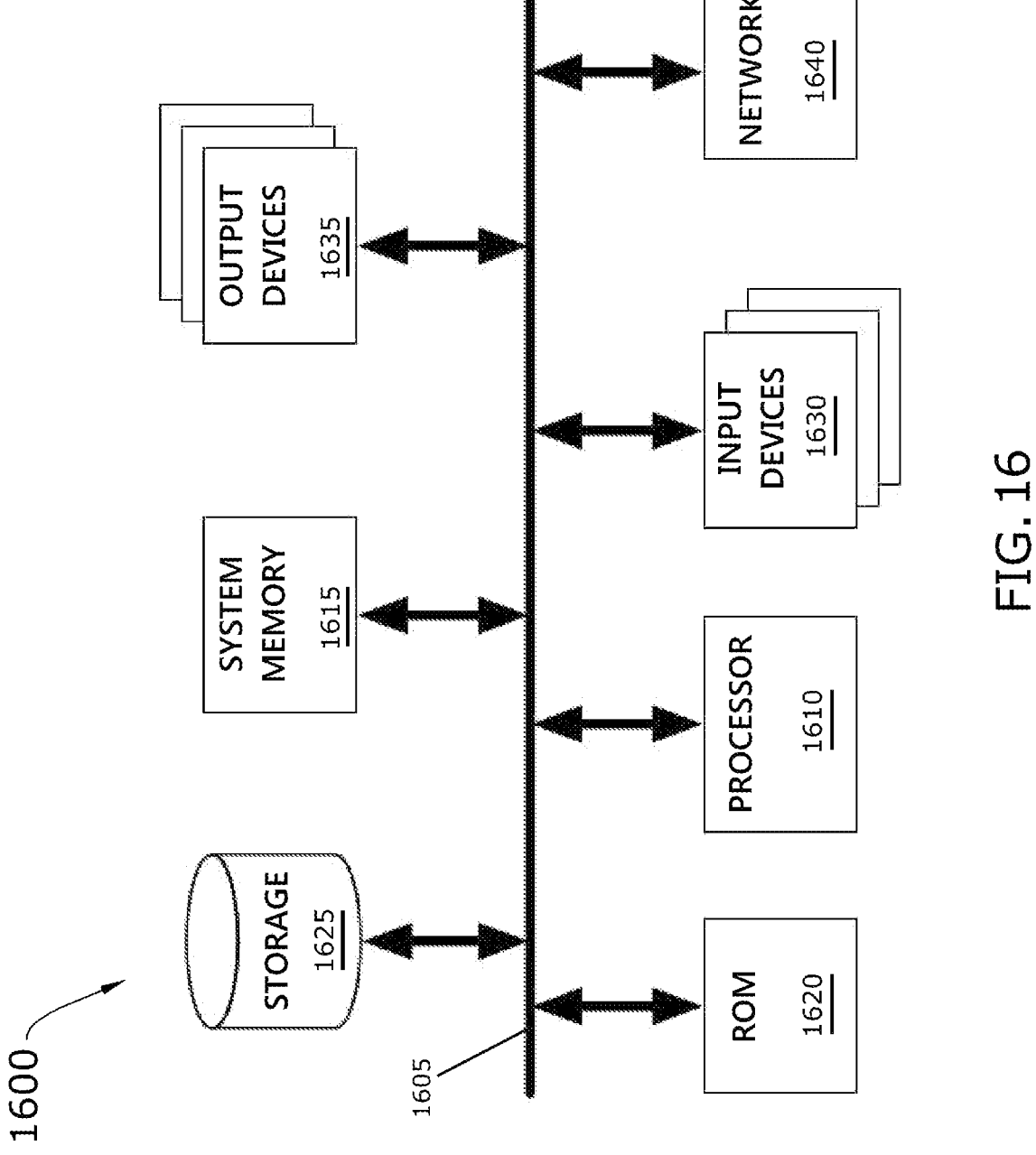

FIG. 16 conceptually illustrates an electronic system with which some embodiments of the invention are implemented.

DETAILED DESCRIPTION

In the following detailed description of the invention, numerous details, examples, and embodiments of the invention are described. However, it will be clear and apparent to one skilled in the art that the invention is not limited to the embodiments set forth and that the invention can be adapted for any of several applications.

Embodiments of the invention described in this specification are directed to a numerical time series analysis and data simplification system and software-implemented numerical time series analysis and data simplification process which simplify data analysis and visualization of numerical time series data, typically from analog data acquisition (DAQ) systems. In some embodiments, the numerical time series analysis and data simplification system and the software-implemented numerical time series analysis and data simplification process (hereinafter referred to individually and/or collectively as the "numerical time series analysis and data simplification system and process") smartly reads and packages large data sets and provides a plurality of numerical time series data analysis functions comprising channel-to-channel math, signal filtering, and concatenation functions. In some embodiments, the numerical time series analysis and data simplification system and process provide a feature that controls the flow of data ingestion. In some embodiments, the numerical time series analysis and data simplification system and process provide a plurality of functions for signal conditioning, compression of files and data sets, concatenation of files and data sets, segmentation and/or splitting of files and data sets, and other types of file/data manipulation. In some embodiments, the numerical time series analysis and data simplification system and process are also configured to perform waveform modeling.

As stated above, viewing and analyzing very large scale numerical time series data streams quickly and efficiently is not readily available across the board in existing systems or the existing options are problematic in specific ways. For instance, most existing systems either apply to very specific file types or are designed to deal with a very broad range of scenarios that make the software very inefficient. Embodiments of the numerical time series analysis and data simplification system and process described in this specification solve such problems by utilizing multiple functions for signal conditioning and manipulation, segmenting and concatenating data sets as needed, smartly reading and packaging large data sets, providing multiple analysis functions, and by defining new file types designed for simplified reading from and writing to memory, as well as providing a feature that controls the flow of data ingestion.

Embodiments of the numerical time series analysis and data simplification system and process described in this specification differ from and improve upon currently existing options and systems which are typically either very narrowly focused (e.g., down to very specific file types) or are overly broad and, therefore, impractical as they become processing heavy. By contrast, the numerical time series analysis and data simplification system and process described in this specification provide a feature that controls the flow of data ingestion and allows for data set segmentation and concatenation. As such, the numerical time series analysis and data simplification system and process described in this specification focus on a very specific engineering problem space and provide a generic solution to the likely variations of the problem space.

The numerical time series analysis and data simplification system and process of the present disclosure may provide the following functions, elements, and operations.

1. Define new file types including, without limitation, continuous numerical time series (NTSC) and discrete numerical time series (NTSD) files.

2. Import and export to other file types including, without limitation, XML file (file meta-data only), MS Excel® (XLSX) files, Mathworks Matlab® (MAT) files, and Comma Separated Value (CSV) files.

3. Model sine waves, square waves, triangle waves, saw-tooth waves, and pulse trains.

4. Math operation of distinct channels (signals) comprising add, subtract, multiply, and divide.

5. Perform conversions comprising polynomial conversion, conversion to Log base 10, and conversion to Log base 2.

6. Provide channel masking (used to emphasize signal feature or events).

7. Perform event detection/identification on condition(s) comprising greater than, less than, between range, and outside of range.

8. Perform compression and smoothing of individual or all channels.

9. Perform smoothing and waveform magnification options (for improved viewing).

10. Split any sufficiently large file into multiple, smaller sized files.

11. Concatenate multiple files into single file.

12. Provide user control of application file size limits.

The various elements of the numerical time series analysis and data simplification system and process of the present disclosure may be related in the following exemplary fashion. It is not intended to limit the scope or nature of the relationships between the various elements and the following examples are presented as illustrative examples only. Defining new file types (#1 above) and importing/exporting (#2 above) provide a generic solution to the respective engineering problem space. Performing the math operation(s) of distinct channels/signals (#4 above), performing conversions (#5 above), providing channel masking (#6 above), and performing event detection/identification (#7 above) collectively provide the signal manipulation and conditioning carried out in the numerical time series analysis and data simplification system and process. In connection with those functions (#4-7 above), the modeling of sine waves, square waves, triangle waves, saw-tooth waves, and pulse trains (#3 above) allows for comparison of actual signals to ideal signals. The remaining functions (#8-12 above) allow the user to efficiently work with and view very large files and/or large size data sets and extract an optimal amount of data for the engineering problem the user is trying to solve.

Among the existing systems and options, gaps in data analysis capabilities continue to persist throughout multiple industries. While many data analysis solutions exist, they tend to be either very specialized or very customizable; both requiring significant resources to take a user's data from some file (or database) to something viewable and understandable. Also, existing solutions vary from specialized custom software, open-source data analysis software languages, and spreadsheet applications, each with their own benefits and drawbacks. Specialized custom software applications have significant costs associated with development and maintenance. Open-source software solutions provide significant power to the user but can have a steep learning curve. Finally, spreadsheets are commonly used and are generally the most recognizable solution, but have significant data size and visualization limitations.

The numerical time series analysis and data simplification system and process of the present disclosure generally works by closing some of the gaps between spreadsheet style analysis solution and open-source or custom software solutions. The software-implemented numerical time series analysis and data simplification process provides a simple solution to basic time series data analysis problems. The numerical time series analysis and data simplification system and process provide numerical time series data analysis features including, without limitation, channel-to-channel math, signal filtering, and data set concatenation functions. Also, the numerical time series analysis and data simplification system and process are configured to prevent a user from loading a file with an excessively large file size. The ability to prevent loading of excessively large files is augmented by a powerful feature whereby the numerical time series analysis and data simplification system and process are configured to perform a compression-on-load operation to load a reduced view of the data. Furthermore, the numerical time series analysis and data simplification system and process are configured to verify the structure of data sets imported from various types of file (e.g., XLSX files, MAT files, CSV files, etc.) and flag an error if not structured in a format suitable for ingest.

To make the numerical time series analysis and data simplification system and process of the present disclosure, a person would likely need to have an understanding of the typical needs of time series analysis problems. That means the person would need to understand the typical problems encountered when processing data, such as processing time, memory limitations, numerical methods, algorithms, etc. After understanding the analysis requirements, limitations, and problems encountered with analyzing this type of data, the person would also need to understand how computers manage data to best determine how to architect a software solution that conforms to the functionality offered by the software-implemented numerical time series analysis and data simplification process of the present disclosure. Finally, the person would need to design and code the software solution to implement the numerical time series analysis and data simplification process. The software solution can be coded in such that is intuitive to a novice user in the engineering space. The software solution could be coded as an executable program to run on a processor of a computing device as a sole instance of the software. Similarly, the software solution could be coded as a cloud compute application service that runs as the numerical time series analysis and data simplification system on a cloud server to which client computing devices connect to utilize the several features described herein including at least the signal conditioning, compression, and file concatenation features.

A person would use the numerical time series analysis and data simplification system and process of the present disclosure to view and analyze numerical time series data using a computing device with a supported operating system (e.g., a Microsoft Windows computing device, a Linux computing device, etc.). The user would open the software application, open their data file, then select a channel(s) to display on the screen. Finally, the user could apply signal filters to the data streams or convert the data stream from one engineering unit to another via the mathematical operations available to them.

By way of example, FIG. 1 conceptually illustrates a high-level numerical time series analysis and data simplification process 100 for simplifying data analysis and visualization of numerical time series data from analog DAQ systems. The high-level numerical time series analysis and data simplification process 100 comprises a plurality of steps that continue in FIG. 2, which conceptually illustrates remaining steps 200 of the high-level numerical time series analysis and data simplification process 100 of FIG. 1.

Starting with FIG. 1, the high-level numerical time series analysis and data simplification process 100 initially receives a user selection (at 102). The user selection is either to load or import an existing file, create a new file, or process an external file. After the user selection is made, the high-level numerical time series analysis and data simplification process 100 determines (at 105) whether to load or import a file. When a file is not intended to be loaded or imported ('NO'), the high-level numerical time series analysis and data simplification process 100 transitions forward to a step for determining (at 115) whether to create a new file, which is described further below. On the other hand, when a file is affirmatively determined (at 105) to be loaded or imported, the high-level numerical time series analysis and data simplification process 100 proceeds to a perform a load or import file process (at 110). The load or import file process (at 110) results in loading a file to a numerical time series (NTS) object in application memory. An example of a detailed load or import file process is described below, by reference to FIG. 3. After loading the file to the NTS object in application memory, the high-level numerical time series analysis and data simplification process 100 transitions to a step for determining (at 125) whether the file is loaded in the application memory (that is, to the NTS object in the application memory). This determination (at 125) is described further below.

As noted above, when the high-level numerical time series analysis and data simplification process 100 determines (at 105) that a file is not intended to be loaded or imported, another determination (at 115) is made as to whether to create a new file. When new file creation is not determined (at 115), the high-level numerical time series analysis and data simplification process 100 proceeds to determine (at 130) whether to process an external file. The determination (at 130) of whether to process an external file is described in greater detail below. On the other hand, when a new file is affirmatively determined (at 115) to be created, the high-level numerical time series analysis and data simplification process 100 performs a create new file process (at 120). The result of performing the create new file process (at 120), unless new file entries have been canceled, is creation of an NTS object in application memory as a new file. An example of a process for creating a new file is described below, by reference to FIG. 4. After creating the new file with the NTS object in application memory, the high-level numerical time series analysis and data simplification process 100 proceeds to the step for determining (at 125) whether the file is loaded in the application memory (that is, to the NTS object in the application memory). This determination (at 125) is described next.

Specifically, when the file is affirmatively determined (at 125) to be loaded in the application (that is, the NTS object is loaded in the application memory), the high-level numerical time series analysis and data simplification process 100 enables the analysis, visualization, and signal conditioning functions, starting with a user determination (at 140) whether to add channels to the file. The determination (at 140) of whether to add channels to the file is described further below. However, when the file is not determined (at 125) to be loaded in the application memory, then the high-level numerical time series analysis and data simplification process 100 transitions back to the step at which the user makes a selection of which file process to engage in-either loading or importing a file, creating a new file, or processing an external file (at 102), and continuing forward as described above.

Turning back to the determination (at 115) of whether to create a new file, when the user selection (at 102) is not a selection of creating a new file, then the high-level numerical time series analysis and data simplification process 100 considers the last option among the available user selections, namely, whether to process an external file (at 130) based on a user selection (at 102) to process an external file. In some embodiments, a single external file or multiple external files can be processed. Accessed from an external source, the external file(s) may need to be converted to another format, concatenated with another file, or split apart. When there is no external file to process, the high-level numerical time series analysis and data simplification process 100 transitions (through reference circle 'B') to one of the remaining steps 200 of the high-level numerical time series analysis and data simplification process 100, as illustrated in FIG. 2. Referring to FIG. 2, therefore, the high-level numerical time series analysis and data simplification process 100 proceeds to a step for determining (at 235) whether to exit the application. When application exit is affirmed, the high-level numerical time series analysis and data simplification process 100 moves to a final step for exiting the application (at 240). Then the high-level numerical time series analysis and data simplification process 100 ends. However, when the determination (at 235) is not to exit the application, in that case the high-level numerical time series analysis and data simplification process 100 returns to the starting step of determining (at 105) whether to load or import a file, which, being illustrated in FIG. 1, is described above.

Now, turning back to the determination (at 130) of whether to process an external file or not, when there is an external file to process, the high-level numerical time series analysis and data simplification process 100 proceeds to a step for converting, concatenating, and/or splitting the file(s)

(at 135). The results depend on the (user selected) operation being performed, either the conversion, concatenation, or splitting. For a conversion, the user would start by selecting a convertible file type, which is then processed for conversion to an application NTS file. For concatenation, the user starts by selecting the desired files which are then concatenated into a single file. For file splitting, the user starts by selecting the desired file(s), resulting in multiple split files. An example of an external file operations process for converting, concatenating, or splitting external files is described below, by reference to FIG. 5.

After converting, concatenating, or splitting file(s) (at 135), the high-level numerical time series analysis and data simplification process 100 transitions (through reference circle 'B') to the step for determining (at 235) whether to exit the application (referencing this step as one of the remaining steps 200, shown in FIG. 2, of the high-level numerical time series analysis and data simplification process 100). As noted above, when application exit is affirmed, the high-level numerical time series analysis and data simplification process 100 moves to a final step for exiting the application (at 240) and then ends. On the other hand, when the determination (at 235) is not to exit the application, the high-level numerical time series analysis and data simplification process 100 simply returns to the starting step of at which the user makes a selection of a file process to engage in (at 102), either loading or importing an existing file, creating a new file, or processing an external file, as described above.

Now turning back to the determination (at 125) of whether the file is loaded in the application or not—in this case, proceeding through the steps of the high-level numerical time series analysis and data simplification process 100 when the file (or rather, the NTS object) is loaded in the application memory. Specifically, when the file is loaded in the application ('YES'), the high-level numerical time series analysis and data simplification process 100 determines (at 140) whether to add channels to the file. One or more channels can be added to the file in application memory including base channel(s), event channel(s), and/or math channel(s). When one or more channel(s) are affirmatively determined (at 140) to be added to the file, the high-level numerical time series analysis and data simplification process 100 proceeds to carry out a process for adding channels (at 145). An example of an add channels process is described further below, by reference to FIG. 9. After adding one or more channel(s) to the file, the high-level numerical time series analysis and data simplification process 100 moves ahead to a step for showing, hiding, or modifying a displayed channel (at 150), which is described next.

Turning back to the determination (at 140) of whether to add channels to the file, when no channel needs to be added ('NO'), the high-level numerical time series analysis and data simplification process 100 continues forward to the step for showing, hiding, or modifying a displayed channel (at 150). The actions involved in showing, hiding, or modifying a displayed channel (at 150) pertain to visualizing the data per channel. An example of a process for showing, hiding, or modifying a displayed channel is described further below, by reference to FIG. 13.

Regardless of whether any changes to the displayed channels (or lack of changes to the displayed channels) were effectuated at the step for showing, hiding, or modifying a displayed channel (at 150), the high-level numerical time series analysis and data simplification process 100 continues forward to a step for navigating through the displayed channels (at 155). By navigating through the displayed channels, the user can show, hide, and/or modify each displayed channel (at 150) as it is navigated to. As such, the user can view the data on a channel-by-channel basis, in clear and concise graphs and plots for various numerical time series of data. Furthermore, the user can select tools to enhance viewing, such as magnification, smoothing, compression, etc. To enact navigation through the displayed channels (at 155), the high-level numerical time series analysis and data simplification process 100 of some embodiments includes a step for determining whether to continue navigating the displayed channels (at 157) after each successive navigation to a particular displayed channel. When the user no longer intends to navigate through the displayed channels ('NO'), the high-level numerical time series analysis and data simplification process 100 proceeds forward to a step at which the channels loaded in the NTS object memory are smoothed and/or compressed (at 160), which is described further below. On the other hand, when the user expresses an indication to continue navigating through the displayed channels ('YES'), the high-level numerical time series analysis and data simplification process 100 follows suit by navigating to the next displayed channel. Then the high-level numerical time series analysis and data simplification process 100 returns back to the step for showing, hiding, or modifying the displayed channel (at 150), which is described in detail above.

While navigating through the displayed channels provides the user with an enhanced viewing experience, and enables the user to show, hide, and/or modify particular channels, the high-level numerical time series analysis and data simplification process 100 moves forward after the user is finished navigating through the displayed channels. Thus, after the user is finished navigating the displayed channels, the high-level numerical time series analysis and data simplification process 100 performs the step mentioned above at which the channels loaded in the NTS object memory are smoothed and/or compressed (at 160). An example of a process for smoothing or compressing channels loaded in NTS object memory is described further below, by reference to FIG. 14. After smoothing and/or compressing channels loaded in the NTS object memory (at 160), the high-level numerical time series analysis and data simplification process 100 proceeds (through reference circle 'A') to the remaining steps 200 of the high-level numerical time series analysis and data simplification process 100. As explained above, the remaining steps 200 are demonstrated in FIG. 2.

Therefore, turning to FIG. 2, the high-level numerical time series analysis and data simplification process 100 determines (at 205) whether to save or export the file. This is a user choice, so the user may opt to skip this (not saving or exporting the file, which would simply erase the NTS object from application memory when the application is closed). Accordingly, when the file is not determined (at 205) to be saved or exported ('NO'), the high-level numerical time series analysis and data simplification process 100 proceeds to another of the remaining steps 200 for determining (at 215) whether to close the file or exit the application. The determination (at 215) of whether to close the file or exit the application is described below. However, when the file is affirmatively determined (at 205) to be saved or exported ('YES'), the high-level numerical time series analysis and data simplification process 100 performs a process to save or export the file (at 210). Saving and/or exporting the file results in a user-selected name and location for the file with the NTS object data written/exported to the selected file location. An example of a process for saving or exporting a file is described further below, by reference to FIG. 15. After saving/exporting the file, the high-level numerical time series analysis and data simplification process 100 proceeds to the determination (at 215) of whether to close the file or exit the application, as described next.

Specifically, the high-level numerical time series analysis and data simplification process 100 determines (at 215) whether to close the file or exit the application. When a file close or application exit selection is determined (at 215) to be made ('YES'), the high-level numerical time series analysis and data simplification process 100 continues forward to a step for determining (at 225) whether to close the file or not. This determination (at 225) is described below. However, when neither file close nor application exit is determined (at 215) to be specified ('NO'), the high-level numerical time series analysis and data simplification process 100 carries out another determination (at 220) of whether to load, import, or create a new file. In particular, the user has not existed the application or closed the file. The user may simply load, import, or create a new file . . . or not. This determination (at 220) specifies that when the user does not intend to load, import, or create a new file, the flow of the high-level numerical time series analysis and data simplification process 100 is directed (through reference circle 'C') to the step shown in FIG. 1 for determining (at 125) whether the file is (still) loaded in the application or not. This determination (at 125) step is the determination that occurred after both the load/import file process step (at 110) and the create new file process step (at 120), as described above. Thus, after determining (at 125) whether the file is loaded in the application, the high-level numerical time series analysis and data simplification process 100 continues forward accordingly (as described above).

On the other hand, when the high-level numerical time series analysis and data simplification process 100 affirmatively determines (at 220) that the user has selected to load, import, or create a new file ('YES'), the flow of the high-level numerical time series analysis and data simplification process 100 is directed back to FIG. 1 (through reference circle 'D') to the start of the overall high-level numerical time series analysis and data simplification process 100, during which the user makes a selection to load/import a file, create a new file, or process an external file (at 102), and continuing forward as detailed above.

Turning back to the determination (at 215), as noted above, when a selection is specified to either close the file or exit the application ('YES'), then the high-level numerical time series analysis and data simplification process 100 moves forward to steps for determining which action is specified. Specifically, the high-level numerical time series analysis and data simplification process 100 determines (at 225) whether to close the file. For instance, the user may have closed the file but left the application open. When the file is not determined (at 225) to be closed, the high-level numerical time series analysis and data simplification process 100 proceeds to a determination (at 235) of whether to exit the application. This is one of the options resulting from the affirmative determination (at 215) of whether to close the file or exit the application. Notable, if the user exits the application without closing the file, the file will be automatically closed at application exit. On the other hand, if the user closes the file but does not exit the application, the application will remain running. Thus, when an affirmative determination (at 225) is made that the file is to be closed ('YES'), the high-level numerical time series analysis and data simplification process 100 closes the file (at 230). However, the application remains running at the stage. So, the high-level numerical time series analysis and data simplification process 100 transitions to the step for determining (at 235) whether to exit the application or not. For example, the user closes the file and then makes a selection to exit the application. Thus, when the high-level numerical time series analysis and data simplification process 100 determines (at 235) to exit the application ('YES'), the high-level numerical time series analysis and data simplification process 100 transitions to the final step for exiting the application (at 240). Then the high-level numerical time series analysis and data simplification process 100 ends. However, when the application is not determined (at 235) to be exited ('NO'), then the high-level numerical time series analysis and data simplification process 100 transitions back to FIG. 1 (through reference circle 'D') to the start of the overall high-level numerical time series analysis and data simplification process 100, during which the user makes a selection to load/import a file, create a new file, or process an external file (at 102), and continuing forward as detailed above.

By way of example, FIG. 3 conceptually illustrates a process for loading a file to a numerical time series (NTS) object in application memory 300. As described above by reference to FIG. 1, when high-level numerical time series analysis and data simplification process 100 performs the load or import file process (at 110), there are several detailed operational steps that occur to complete the load/import file process. The process for loading a file to a numerical time series (NTS) object in application memory 300 in FIG. 3 demonstrates several of those operational steps involved in carrying out the load/import file process.

Specifically, the process for loading a file to an NTS object in application memory 300 starts by determining (at 305) whether to load a file. When the determination (at 305) affirms the loading of a file ('YES'), the process for loading a file to an NTS object in application memory 300 transitions to a step at which the user selects the desired file to load (at 320). On the other hand, when a file is not determined (at 305) to be loaded ('NO'), the process for loading a file to an NTS object in application memory 300 performs another determination (at 310) of whether to import a file. When the determination (at 310) does not require file import ('NO'), the process for loading a file to an NTS object in application memory 300 ends. The process for loading a file to an NTS object in application memory 300 ends at this point because neither file loading nor file importing is needed.

However, when file import is determined (at 310) to be needed ('YES'), the process for loading a file to an NTS object in application memory 300 proceeds to a step at which the user selects an importable file type (at 315). For example, the user may select an importable file type such as XML file type, MS Excel® (XLSX) file type, Mathworks Matlab® (MAT) file type, Comma Separated Value (CSV) file type, etc. After the user selects the importable file type, the process for loading a file to an NTS object in application memory 300 moves forward to the step at which the user selects the desired file (at 320). This is the same step that is performed after the determination (at 305) is made to load the file ('YES').

After the user selects the desired file (at 320), the process for loading a file to an NTS object in application memory 300 performs a step for validating the file contents (at 325) of the user-selected file. In some embodiments, the process for loading a file to an NTS object in application memory 300 validates the file contents according to the file type and the type of data expected to be present in the user-selected file. The process for loading a file to an NTS object in application memory 300 then determines (at 330) whether the file contents of the user-selected file are valid or not.

When the file contents are not determined (at 330) to be valid ('NO'), the process for loading a file to an NTS object in application memory 300 transitions to a step for prompting the user with a validation error (at 335). The validation error informs the user, for example through a user interface of the application, that the selected file has at least some contents that are not valid for use. Then the process for loading a file to an NTS object in application memory 300 ends. This allows the user to fix the problematic file contents or start the process for loading a file to an NTS object in application memory 300 over to either load a file or import a file with valid file contents.

Turning back to the determination (at 330), when the file contents of the user-selected file are assessed to be valid ('YES'), then the process for loading a file to an NTS object in application memory 300 moves forward to a step for determining (at 340) whether a file limit is exceeded or not. When the file limit is not exceeded ('NO'), the process for loading a file to an NTS object in application memory 300 continues forward to a step for converting and/or loading the user-selected file to an NTS object in application memory (at 345). Then the process for loading a file to an NTS object in application memory 300 ends.

On the other hand, when the user-selected file is determined (at 340) to exceed the file limit ('YES'), then the process for loading a file to an NTS object in application memory 300 performs several steps involving either compression or a partial loading of the user-selected file. In particular, the process for loading a file to an NTS object in application memory 300 determines (at 350) whether partial file load mode is enabled in the application or not.

When partial file load mode is affirmatively enabled in the application ('YES'), the process for loading a file to an NTS object in application memory 300 proceeds to prompt the user to select a portion of the user-selected file to load (at 355). This may involve the user viewing a preview of the file contents and selecting a portion of the file contents to load. Next, the process for loading a file to an NTS object in application memory 300 converts and/or loads header data and meta data from the user-selected file to the NTS object in application memory (at 360). Then the process for loading a file to an NTS object in application memory 300 loads the selected portion of the file contents to the NTS object, specifically loading the portion of the file's channels to the NTS object in application memory (at 365). Then the process for loading a file to an NTS object in application memory 300 ends.

Turning back to the determination (at 350), when partial file load mode is not enabled in the application ('NO'), the process for loading a file to an NTS object in application memory 300 then prompts the user to enter data compression settings (at 370) to use to compress the file contents and load the user-selected file to an NTS object in application memory. After entering the data compression setting to use in compressing the file contents, the process for loading a file to an NTS object in application memory 300 converts and/or load the header data and the meta data of the user-selected file to the NTS object in application memory (at 375) followed by compressing and loading the file's channels to the NTS object in application memory (at 380). Then the process for loading a file to an NTS object in application memory 300 ends.

By way of example, FIG. 4 conceptually illustrates a process for creating a new file 400. As described above by reference to FIG. 1, when high-level numerical time series analysis and data simplification process 100 performs the create new file process (at 120), there are several detailed operational steps that occur to complete the create new file process. The process for creating a new file 400 in FIG. 4 demonstrates several of those operational steps involved in carrying out the create new file process.

Specifically, the process for creating a new file 400 starts by reading application preference settings (at 410). The application preference settings are stored in the application. The application preference settings may be set to default settings before a user changes them to custom settings. When a new file is to be created, the process for creating a new file 400 prompts the user to enter new file setting (at 420). The user may accept the default settings if they are suitable for the new file being created. Alternatively, the user may enter custom settings for creating the new file. Next, the process for creating a new file 400 determines (at 430) whether the user has canceled new file entries or not. When the user has canceled new file entries ('YES'), the process for creating a new file 400 ends. However, when new file entries are not canceled in the settings ('NO'), the process for creating a new file 400 moves ahead to another step for creating an NTS object in application memory (at 440). Then the process for creating a new file 400 ends.

Now turning to another process, FIG. 5 conceptually illustrates an external file operations process for converting, concatenating, or splitting external files 500. As described above by reference to FIG. 1, when high-level numerical time series analysis and data simplification process 100 performs the step for converting, concatenating, or splitting files (at 135), there are several detailed determination steps that occur to narrow down whether to convert a file, concatenate multiple files, or split a file. The external file operations process for converting, concatenating, or splitting external files 500 shown in FIG. 5 demonstrates cascading determinations to home in on file converting operations, file concatenation operations, or file splitting operations.

Specifically, the external file operations process for converting, concatenating, or splitting external files 500 starts by determining (at 510) whether to convert files. When it is determined (at 510) that file conversion is needed ('YES'), the external file operations process for converting, concatenating, or splitting external files 500 proceeds to step for performing a convert files process (at 520). An example of a convert files process is described below, by reference to FIG. 6. After performing the convert files process (at 520), the external file operations process for converting, concatenating, or splitting external files 500 ends.

On the other hand, when it is determined (at 510) that file conversion is not needed ('NO'), the external file operations process for converting, concatenating, or splitting external files 500 skips the convert files process (at 520) and proceeds to another step for determining (at 530) whether to concatenate files or not. When it is determined (at 530) that file concatenation is needed ('YES'), the external file operations process for converting, concatenating, or splitting external files 500 proceeds to step for performing a concatenate files process (at 540). An example of a concatenate files process is described below, by reference to FIG. 7. After performing the concatenate files process (at 540), the external file operations process for converting, concatenating, or splitting external files 500 ends.

Turning back to the determination (at 530), when file concatenation is not needed or desired, the external file operations process for converting, concatenating, or splitting external files 500 moves ahead to a final determination (at 550) of whether to split files or not. When it is determined (at 550) that file splitting is needed ('YES'), the external file operations process for converting, concatenating, or splitting external files 500 proceeds to step for performing a split file process (at 560). An example of a split file process is described below, by reference to FIG. 8. After performing the split file process (at 560), the external file operations process for converting, concatenating, or splitting external files 500 ends. Similarly, when it is determined (at 550) that file splitting is not needed or desired, the external file operations process for converting, concatenating, or splitting external files 500 ends.

As noted in the description of the external file operations process for converting, concatenating, or splitting external files 500, the convert files process (at 520) is further described in detail by reference to FIG. 6, the concatenate files process (at 540) is further described in detail by reference to FIG. 7, and the split file process (at 560) is further described by reference to FIG. 8. These separate processes are described next.

To start, FIG. 6 conceptually illustrates a convert files process 600. The convert files process 600 involves a plurality of operational steps that are performed to complete the convert files process (at 520) described above, by reference to FIG. 5. As shown in this figure, the convert files process 600 starts with a step at which the user selects a convertible file type (at 610). The convertible file type selection is made by the user to specify the type of file to convert into an application NTS file type. The selection of the convertible file type may apply to one or more user-selected (desired) file(s). Thus, after selecting the convertible file type (at 610), the convert files process 600 moves on to a step at which the user selects one or more desired file(s) to convert (at 620) into the application NTS file. The user may select a single desired file to convert to the application NTS file type or, alternatively, multiple different files that are desired for conversion to the application NTS file type.

After the user has selected the convertible file type (at 610) and the desired file(s) to convert (at 620), the convert files process 600 moves ahead to step for determining (at 630) whether the user has canceled file selection or not. The determination (at 630) is made based on a user-provided response to a prompt to confirm that the selected files should be converted. The prompt may be visually output in the user interface of the application. The prompt may be configured to hold up the file conversion operation until the user affirms the selected files to be converted. Thus, when the user responds to the prompt by declining the conversion of the selected files, the convert files process 600 determines (at 630) that the user has canceled the file selections ('YES'), and the convert files process 600 ends.

However, when the user responds to the prompt by affirming the file selections for conversion, then the convert files process 600 determines (at 630) that the user has not canceled the file selections ('NO') and proceeds forward to a step for validating the file contents (at 640) of each desired file selected to be converted to the application NTS file. The validation of file contents may involve inspecting the data of each desired file and determining whether the data is of a type that conforms to the application NTS file.

After performing the step for validating the file contents (at 640), the convert files process 600 determines (at 650) whether the file contents are valid or not. When the file contents are determined (at 650) not to be valid ('NO'), the convert files process 600 moves forward to a step for displaying an error message to the user (at 660), after which the convert files process 600 ends. The error message may be visually output in the user interface of the application and even though the convert files process 600 may end, the user may go back to start the process again.

On the other hand, when the file contents of the desired file are affirmatively determined (at 650) to be valid ('YES'), the convert files process 600 skips the step for displaying the error message (at 660) and, instead, proceeds to a step for converting the user-selected desired files from the (current) convertible file type to the application NTS file type (at 670). The step for converting the user-selected desired files from the (current) convertible file type to the application NTS file type (at 670) may be performed successively by the convert files process 600, once for each of the desired files to convert. In some embodiments, this is based on the convert files process 600 converting a first desired file to the application NTS file (at 670) and then determining (at 680) whether all of the desired files have been converted. When all the desired files have not been converted ('NO'), the convert files process 600 transitions back to the step for validating the file contents (at 640) of the next successive desired file to convert to the application NTS file type, and proceeding forward through the steps (at 650-680) described above.

On the other hand, when all the desired files have been successfully converted ('YES'), the convert files process 600 proceeds to a final step for displaying a success message to the user (at 690). The success message may be visually output within the user interface of the application. Then the convert files process 600 ends.

Next, FIG. 7 conceptually illustrates a concatenate files process 700. The concatenate files process 700 involves a plurality of operational steps that are performed to complete the concatenate files process (at 540) described above, by reference to FIG. 5. As shown in this figure, the concatenate files process 700 starts with a step at which the user selects the files to concatenate (at 705). The files to concatenate include two or more files desired by the user to be concatenated together into a single file. The concatenation is specific in that the file contents are ordered, not mixed. In other words, the file contents of a second desired file selected by the user (at 705) is appended to the end of the file contents of a first desired file selected by the user (at 705). If there is a third desired file (or more than three), the file contents are appended to the end of the file contents of the concatenated file contents (of the first and second files), and so forth.

Next, the concatenate files process 700 proceeds to a step for determining (at 710) whether the user has canceled file selection or not. The determination (at 710) is made based on a user-provided response to a prompt to confirm that the selected files should be concatenated, similar to the determination (at 630) step described above, by reference to FIG. 6. Thus, when the user responds to the prompt by canceling the concatenation of the selected files ('YES'), the concatenate files process 700 cancels the file selections. Then the concatenate files process 700 ends.

However, when the user responds to the prompt by not canceling the concatenation of the selected files ('NO'), then the concatenate files process 700 proceeds forward to a step for validating the file contents (at 715) of each desired file selected to be concatenated together into a single file. The validation of file contents may involve inspecting the data of each desired file and determining whether the data is of a type that can be concatenated into a single file, and thereafter, converted to an application NTS file/object. As such, the concatenate files process 700 determines (at 720) whether the file contents of the desired files are valid or not. When the file contents are not valid ('NO'), the concatenate files process 700 moves forward to a step for displaying an error message to the user and exporting the meta data (at 725) of the file(s). Then the concatenate files process 700 ends.

However, when the file contents are affirmatively determined (at 720) to be valid ('YES'), the concatenate files process 700 continues forward to a step for determining (at 730) whether to export the meta data of the desired files. When meta data of the desired files are determined (at 730) to be exported ('YES'), the concatenate files process 700 performs a step for exporting the meta data of the desired files to separate file(s) (at 735), followed by prompting the user to enter compression selections (at 740).

On the other hand, when meta data of the desired files are not determined (at 730) to be exported ('NO'), the concatenate files process 700 skips the step for exporting the meta data of the desired files to separate file(s) and, instead, proceeds directly to the step for prompting the user to enter compression selections (at 740). The compression selections may be set to default compression settings in the application preference settings. In some embodiments, the default compression settings are set to 'no data compression'. In some embodiments, the user can proceed with the default compression settings or override the default compression settings by selection of a particular type of compression to apply to the data during the concatenation of the data in the desired files.

After prompting the user to enter compression selections (at 740), the concatenate files process 700 performs the step for concatenating the desired files (at 745). As noted above, concatenation of the files may involve appending the file contents (or the compressed file contents) of the second user-selected desired file to the end of the file contents (or the compressed file contents) of the first user-selected desired file (and so forth when there are three or more desired files selected by the user to concatenate together into a single file). The result at completion of the step for concatenating the desired files (at 745) is a single, fully-concatenated file with the file contents (or compressed file contents) of all desired files selected by the user for concatenation.

Next, the concatenate files process 700 determines (at 750) whether or not to save the fully-concatenated file or not. When the user opts not to save the fully-concatenated file ('NO'), the concatenate files process 700 ends. However, when the user wishes to save the fully-concatenated file ('YES'), the concatenate files process 700 of some embodiments proceeds to save the fully-concatenated file and display a success message to the user (at 755). The fully-concatenated file may be saved to a user-specified location that is accessible to the application. The success message may be visually output in the user interface of the application for the user to view. Then, after saving the fully-concatenated file, the concatenate files process 700 ends.

Rounding out the detailed processes corresponding to the external file operations process for converting, concatenating, or splitting external files 500 of FIG. 5, FIG. 8 conceptually illustrates a split file process 800. The split file process 800 involves a plurality of operational steps that are performed to complete the split file process (at 560) described above, by reference to FIG. 5. As shown in this figure, the split file process 800 starts with a step at which the user selects the desired file(s) to split (at 810). The user may select a single desired file to split into two or more files. Alternatively, the user may select multiple different desired files, and the split file process 800 will split each desired file into two or more files.

After the user selects the desired files to split (at 810), the split file process 800 proceeds to the next step for determining (at 820) whether the user has canceled file selection. Similar to the determinations (at 630 and at 710) of whether the user has canceled file selection, described above reference to FIGS. 6 and 7, the determination (at 820) of the split file process 800 is made based on a user-provided response to a prompt asking for confirmation or cancellation of the file selections. When user responds to the prompt by canceling the selection of the desired files to split ('YES'), the split file process 800 cancels the selection of the desired files. Then the split file process 800 ends.

On the other hand, when the user responds to the prompt by not canceling the selection of files for splitting ('NO'), the split file process 800 proceeds forward to a step for validating the file contents (at 830) of the desired files selected for splitting. If more than one desired file was selected (at 810) for splitting, each desired file is checked to validate its file contents. For validating the file contents (at 830), the split file process 800 checks the data and metadata to ascertain type(s) of data, quantity of data, and other qualities of the data in the file. Then the split file process 800 determines (at 840) whether the file contents of the desired file(s) are valid or not. When the file contents are not valid ('NO'), the split file process 800 moves forward to a step for displaying an error message (at 850) to the user explaining that the file contents of the desired file(s) are not valid. Then the split file process 800 ends.

By contrast, when the file contents of the desired file(s) are affirmatively determined (at 840) to be valid ('YES'), the split file process 800 proceeds forward to prompt the user to enter file split selections (at 860). For example, the user may select half of the file contents in the desired file to mark off a first split file, with the remaining file contents (not selected) being designated for splitting off as a second split file. After the user enters the file split selections (at 860), the split file process 800 continues on to the next step for splitting the desired file(s) (at 870). By splitting the desired file(s), the split file process 800 creates two or more 'split files' according to the file split selections entered by the user. After splitting the desired file(s) (at 870), the split file process 800 performs a final step of saving the 'split' files and displaying a 'success' message to the user (at 880). Then the split file process 800 ends.

The next process is similar to the process described above by reference to FIG. 5. Specifically, FIG. 9 conceptually illustrates an add channels process 900. The add channels process 900 details the steps involved in the add base, event, or math channels step (at 145), described above by reference to FIG. 1. The add channels process 900 involves several detailed determination steps starting with determining (at 910) whether to add a base channel to the file loaded in the application. Regardless of whether the file was loaded into the application, imported into the application, or created new in the application, the add channels process 900 performs an add base channel process (at 920) when the determination (at 910) to add the base channel is affirmed ('YES'). An example of an add base channel process is described below, by reference to FIG. 10. After performing the add base channel process (at 920), the add channels process 900 ends.

On the other hand, a determination (at 910) not to add a base channel ('NO') means the add channels process 900 skips the add base channel process (at 920) and continues forward to a step for determining (at 930) whether to add an event channel to the file loaded in the application. When an event channel is determined (at 930) to be added to the file loaded in the application ('YES'), the add channels process

900 moves ahead to perform an add event channel process (at 940). An example of an add event channel process is described below, by reference to FIG. 11. After performing the add event channel process (at 940), the add channels process 900 ends.

Turning back to the determination (at 930), when adding an event channel is not indicated ('NO'), the add channels process 900 proceeds to a step for determining (at 950) whether to add a math channel or not. When a math channel is affirmatively determined (at 950) to be added to the file loaded in the application ('YES'), the add channels process 900 performs an add math channel process (at 960). An example of an add math channel process is described below, by reference to FIG. 12. After performing the add math channel process (at 960), the add channels process 900 ends. On the other hand, when it is determined (at 950) that adding a math channel is not needed or indicated, the add channels process 900 ends without ever performing the add math channel process (at 960).

As noted in the description of the add channels process 900, the add base channel process (at 920) is further described in detail by reference to FIG. 10, the add event channel process (at 940) is further described in detail by reference to FIG. 11, and the add math channel process (at 960) is further described by reference to FIG. 12. These separate processes are described next.

To start, FIG. 10 conceptually illustrates a process for adding a base channel 1000 to the file loaded in the application. The process for adding a base channel 1000 involves a plurality of operational steps that are performed to complete the add base channel process (at 920) described above, by reference to FIG. 9. As shown in this figure, the process for adding a base channel 1000 starts with a step at which the user selects a base channel simulation type (at 1010). The base channel simulation type allows the user to simulate a waveform from an analytical model, or simulate a waveform mask. A waveform mask is a copy of an existing waveform with all "uneventful" portions of the waveform obscured, eventful vs. uneventful portions of which is defined by an associated event channel (data stream). After the user selects the base channel simulation type (at 1010), the process for adding a base channel 1000 proceeds to a step for determining (at 1020) whether a channel masking type is selected. When the user has affirmatively selected a channel masking type ('YES'), the process for adding a base channel 1000 prompts the user to enter the channel masking selections (at 1030). After the user enters the channel masking selections (at 1030), the process for adding a base channel 1000 proceeds to a step for determining (at 1050) whether the user selections have been canceled.

Turning back to the determination (at 1020), when the user has not selected a channel masking type ('NO'), the process for adding a base channel 1000 prompts the user to enter waveform simulation selections (at 1040), as opposed to channel masking selections. After the user enters the waveform simulation selections (at 1040), the process for adding a base channel 1000 proceeds forward to the step for determining (at 1050) whether the user selections have been canceled.

To process the determination (at 1050) of whether the user selections have been canceled, the process for adding a base channel 1000 simply checks to see if the waveform simulation selections (at 1040) or the channel masking selections (at 1030) have been canceled by the user. For example, the user may cancel the selections through the user interface of the application by deselecting or unchecking such selections. When the user has affirmatively canceled the selections ('YES'), the process for adding a base channel 1000 ends. By contrast, when the user has not canceled the selections ('NO'), the process for adding a base channel 1000 moves forward to a step for adding the simulated channel (waveform simulation) or the masked channel to the NTS object in application memory (at 1060). This is followed by the process for adding a base channel 1000 updating file navigation panel information (at 1070) in accordance with the added channel. Then the process for adding a base channel 1000 ends.

Turning to another add channel process, FIG. 11 conceptually illustrates a process for adding an event channel 1100 to the file loaded in the application. The process for adding an event channel 1100 involves a plurality of operational steps that are performed to complete the add event channel process (at 940) described above, by reference to FIG. 9. As shown in this figure, the process for adding an event channel 1100 starts with a step at which the user selects an event channel trigger type (at 1110). The selected event channel trigger type provides one or more event detection functions which are presented as user interface tools for selection by the user from the user interface of the application. After the user selects the event channel trigger type (at 1110), the process for adding an event channel 1100 proceeds to a step for verifying that channel(s) exist in the NTS object in application memory (at 1120). The results of the verification of channel(s) in the NTS object are evaluated by the process for adding an event channel 1100. Based on the evaluation, the process for adding an event channel 1100 determines (at 1130) whether the channel(s) exist in the NTS object or not. When the channel(s) are not present or existing in the NTS object in application memory ('NO'), the process for adding an event channel 1100 ends.

On the other hand, when the channel(s) are determined (at 1130) to exist in the NTS object, then the process for adding an event channel 1100 prompts the user to enter event channel selections (at 1140). After the user enters the event channel selections (at 1140), the process for adding an event channel 1100 moves forward to another step for determining (at 1150) whether the user-specified event channel selections have been canceled. When the user-specified event channel selections have affirmatively been canceled ('YES'), the process for adding an event channel 1100 ends. However, when the user-specified event channel selections have not been canceled ('NO'), the process for adding an event channel 1100 performs two additional steps before ending.

Specifically, the process for adding an event channel 1100 performs an event detection operation (according to the user-specified event channel selections and the event channel trigger type) and adds the event channel to the NTS object in application memory (at 1160). Next, the process for adding an event channel 1100 updates the file navigation panel information (at 1170) to reflect the event channel trigger type, the user-specified event channel selections, and the fact that the event channel was added to the NTS object in application memory. Then the process for adding an event channel 1100 ends.

Turning to another 'add channel' process, FIG. 12 conceptually illustrates a process for adding a math channel 1200 to the file loaded in the application. The process for adding a math channel 1200 involves a plurality of operational steps that are performed to complete the add math channel process (at 960) described above, by reference to FIG. 9. As shown in this figure, the process for adding a math channel 1200 starts with a step at which the user selects a math channel type (at 1210). The math channel type selected provides one or more mathematical functions which are presented as user interface tools for selection by the user from the user interface of the application. After the user selects the math channel type (at 1210), the process for adding a math channel 1200 proceeds to a step for verifying that channel(s) exist in the NTS object in application memory (at 1220). Based on the results of the verification, the process for adding a math channel 1200 determines (at 1230) whether the channel(s) exist in the NTS object or not. When the channel(s) are not present, not available, or otherwise do not exist in the NTS object ('NO'), the process for adding a math channel 1200 ends.

However, when the channel(s) are determined (at 1230) to exist in the NTS object ('YES'), then the process for adding a math channel 1200 prompts the user to enter math channel selections (at 1240). After the user enters the math channel selections (at 1240), the process for adding a math channel 1200 moves forward to another step for determining (at 1250) whether the user-entered math channel selections have been canceled or not. When the user-entered math channel selections have been canceled ('YES'), the process for adding a math channel 1200 ends. By contrast, when the math channel selections have not been canceled ('NO'), the process for adding a math channel 1200 then moves forward to the final two steps. Specifically, the process for adding a math channel 1200 performs a math channel operation (according to the user-entered math channel selections for the math channel type) and adds the math channel to the NTS object in application memory (at 1260). Next, the process for adding a math channel 1200 updates the file navigation panel information (at 1270), shown in the user interface of the application, to reflect the math channel type, the math channel selections, and the results of applying the math channel operation(s) to the NTS object in application memory. Then the process for adding a math channel 1200 ends.

After completing any/all of the 'add channel' processes, as required, indicated, and/or needed, the user is able to customize the view/visualization of channels. Specifically, the step for showing, hiding, or modifying a displayed channel (at 150), described above by reference to FIG. 1, are fleshed out in detail, as described next by reference to FIG. 13.

In particular, FIG. 13 conceptually illustrates a process for showing, hiding, or modifying a displayed channel 1300. When the process for showing, hiding, or modifying a displayed channel 1300 is performed in connection with the step for showing, hiding, or modifying a displayed channel (at 150), described above by reference to FIG. 1, there will already be one or more displayed channels after adding channels (i.e., base, event, and/or math channel(s)). However, the user may interact with the user interface to make appropriate changes to the channels, independently of performing the step for showing, hiding, or modifying a displayed channel (at 150), described above by reference to FIG. 1. In any event, the process for showing, hiding, or modifying a displayed channel 1300 starts by determining (at 1305) whether to update a number of plots shown in the user interface of the application. When the number of plots shown in the user interface are not determined (at 1305) to be updated ('NO'), the process for showing, hiding, or modifying a displayed channel 1300 transitions to a step for determining (at 1320) whether to show or hide a channel (at 1320), which is described further below.

On the other hand, when the determination (at 1305) is made to update the number of plots shown in the user interface of the application, then the process for showing, hiding, or modifying a displayed channel 1300 proceeds to a step at which the user selects a number of plots to be shown in the user interface of the application (at 1310). For example, three plots may be shown in the user interface initially and the user updates the number of plots shown to add two more, increasing the total number of plots shown in the user interface to five. After selecting the number of plots to be shown in the user interface, the process for showing, hiding, or modifying a displayed channel 1300 updates the number of plots shown in the user interface (at 1315) to reflect the updated number of plots specified by the user. After updating the number of plots shown in the user interface, the process for showing, hiding, or modifying a displayed channel 1300 proceeds to the determination (at 1320) of whether to show or hide a channel, as described next.

Specifically, the process for showing, hiding, or modifying a displayed channel 1300 determines (at 1320) whether the user wishes to show certain channels or hide certain channels. When there is no indication that the user intends to show or hide a channel ('NO'), the process for showing, hiding, or modifying a displayed channel 1300 transitions directly to a step for determining (at 1330) whether to magnify a visible channel. However, when the user makes a selection in the user interface to either show or hide channels, the process for showing, hiding, or modifying a displayed channel 1300 proceeds to a step at which the user selects a particular plot channel to either show or hide (at 1322). For instance, a plot channel that is currently displayed in the user interface may be selected by the user to hide. Alternatively, the user may select a channel, which is currently not shown, from a list of all channels for the NTS object in application memory, in order to make the selected channel visible in the user interface. The user could also select a currently visible channel from the list of all channels, in order to hide the visible channel. After the user selects the particular plot channel to show/hide (at 1322), the process for showing, hiding, or modifying a displayed channel 1300 proceeds to show or hide the particular plot channel (at 1325) selected by the user. Then the process for showing, hiding, or modifying a displayed channel 1300 moves forward to the step for determining (at 1330) whether to magnify a visible channel, which is described next.

Whether a plot channel was made visible or hidden from visibility in the user interface, the process for showing, hiding, or modifying a displayed channel 1300 now performs a step for determining (at 1330) whether to magnify a visible channel. The choice to magnify a visible channel impacts the display and visualization of the plot channel and can increase the detailed view of the numeric time series data as plotted. When the user does not wish to magnify a visible channel ('NO'), the process for showing, hiding, or modifying a displayed channel 1300 transitions directly to a step for determining (at 1350) whether to smooth a plot channel that is visible in the user interface, which is described further below. On the other hand, when the user makes a selection in the user interface to magnify a visible channel ('YES'), the process for showing, hiding, or modifying a displayed channel 1300 proceeds to a step at which the user selects a particular plot channel to magnify (at 1335) in the user interface. After selecting the particular plot channel to magnify (at 1335), the process for showing, hiding, or modifying a displayed channel 1300 prompts the user to select magnification settings (at 1340). For example, the user is prompted to select a magnification percentage (e.g., 50%, 100%, 150%, 200%, 400%, etc.). After the user selects a magnification setting, the process for showing, hiding, or modifying a displayed channel 1300 magnifies the particular plot channel, updates the plot window, and updates the data displayed for the plot channel (at 1345). Then the process for showing, hiding, or modifying a displayed channel 1300 moves forward to the step for determining (at 1350) whether to smooth a visible channel, which is described next.

Specifically, the process for showing, hiding, or modifying a displayed channel 1300 performs the step for determining (at 1350) whether to smooth a visible channel or not, based on a user selection or indication made in the user interface to carry out a smoothing operation. When the user does not wish to smooth a visible plot channel ('NO'), the process for showing, hiding, or modifying a displayed channel 1300 transitions directly to a step for determining (at 1370) whether to update line properties for the plot(s) shown in the user interface, which is described further below. However, when the user affirmatively intends to smooth a visible channel in the user interface, the process for showing, hiding, or modifying a displayed channel 1300 performs several steps starting with a step at which the user selects a particular plot channel to smooth (at 1355). Next, the process for showing, hiding, or modifying a displayed channel 1300 prompts the user to select a smoothing filter and a sample width (at 1360) to apply to the particular plot channel selected by the user. For example, the user may select a particular smoothing or compression filter to apply and input a sample width for the smoothed plot. After the user has selected the smoothing filter and the sample width to apply to the particular plot channel, the process for showing, hiding, or modifying a displayed channel 1300 moves forward to a step for smoothing the particular plot channel, updating the plot window associated with the particular plot channel, and updating the channel data displayed in the user interface (at 1365). Then the process for showing, hiding, or modifying a displayed channel 1300 proceeds to the determination (at 1370) of whether to update the line properties for the plot(s) shown in the user interface, which is described next.

In some embodiments, the process for showing, hiding, or modifying a displayed channel 1300 determines (at 1370) whether to update the line properties for a particular plot channel. When the user does not wish to update the line properties for any of the plot channels ('NO'), the process for showing, hiding, or modifying a displayed channel 1300 ends. However, when the user indicates a desire to update the line properties for a plot channel ('YES'), the process for showing, hiding, or modifying a displayed channel 1300 transitions to a step at which the user selects a particular plot channel for which to update the line properties of that plot channel (at 1375). After the users selects the particular plot channel (at 1375), the process for showing, hiding, or modifying a displayed channel 1300 prompts the user to select the line properties to apply to the particular plot channel during the update (at 1380). After the user has selected the line properties, the process for showing, hiding, or modifying a displayed channel 1300 updates the plot window associated with the particular plot channel and updates the channel display data shown in the user interface (at 1385). Then the process for showing, hiding, or modifying a displayed channel 1300 ends.

While the process for showing, hiding, or modifying a displayed channel 1300 pertains to modifications of a displayed channel and includes a few steps for smoothing a particular plot channel, FIG. 14 conceptually illustrates a comprehensive process for smoothing or compressing channels that are loaded in NTS object memory 1400. Thus, the smoothing aspects of the comprehensive process for smoothing or compressing channels that are loaded in NTS object memory 1400 can be applied to all channels or several selected channels. Additionally, the comprehensive process for smoothing or compressing channels that are loaded in NTS object memory 1400 supports channel compression operations. Notably, making reference back to FIG. 1, the comprehensive process for smoothing or compressing channels that are loaded in NTS object memory 1400 involves several detailed steps which may be carried out when the step for smoothing and/or compressing the channels loaded in the NTS object memory (at 160) is performed by the high-level numerical time series analysis and data simplification process 100. Alternatively, the user may interact with menus and/or tools in the application's user interface to independently perform the comprehensive process for smoothing or compressing the channels that are loaded in NTS object memory 1400, with the user intending to apply smoothing filter(s) and/or compression to all of the channel plots loaded in the NTS object in application memory.

To start, the comprehensive process for smoothing or compressing channels that are loaded in NTS object memory 1400 determines (at 1410) whether to smooth channels or not. When the user expresses an affirmative intention to smooth channels ('YES'), the comprehensive process for smoothing or compressing channels that are loaded in NTS object memory 1400 moves on to a step for determining (at 1420) whether to smooth all channels loaded in the NTS object memory, the subsequent steps of which are described in detail further below.

Turning back to the determination (at 1410), when the user has not expressed an intention or desire to smooth channels ('NO'), the comprehensive process for smoothing or compressing channels that are loaded in NTS object memory 1400 transitions to a different step for determining (at 1430) whether to compress channels or not. Even though the user has not expressed an intention to smooth the channels, it is possible that the user instead wishes to compress the data for the channels of the NTS object. Thus, when the user does not express an intention to compress any channel ('NO'), the comprehensive process for smoothing or compressing channels that are loaded in NTS object memory 1400 ends. On the other hand, when the user has expressed an intention to compress channels ('YES'), the comprehensive process for smoothing or compressing channels that are loaded in NTS object memory 1400 moves forward to a step at which the user selects a compression filter and a sample width to apply to the channels of the NTS object (at 1440). Next, the comprehensive process for smoothing or compressing channels that are loaded in NTS object memory 1400 compresses the NTS object data in application memory and updates the user interface (at 1450) according to the compression filter and sample width selected by the user.

Turning back to the determination (at 1420), when the user does not intend to smooth all of the channels loaded in the NTS object memory ('NO'), the comprehensive process for smoothing or compressing channels that are loaded in NTS object memory 1400 proceeds to a series of steps for applying smoothing only to select channels of the NTS object (at 1480 and 1490), which are described in detail below. However, when the user affirmatively intends to smooth all channels loaded in the NTS object memory ('YES'), the comprehensive process for smoothing or compressing channels that are loaded in NTS object memory 1400 moves ahead to a step at which the user selects a smoothing filter and sample width (at 1460) to apply to all channels loaded in the NTS object. After the user selects the smoothing filter and the sample width, the comprehensive process for smoothing or compressing channels that are loaded in NTS object memory 1400 continues forward to a step for smoothing the NTS object data in application memory (at 1470) based on the smoothing filter and the sample width selected by the user (at 1460). Furthermore, the comprehensive process for smoothing or compressing channels that are loaded in NTS object memory 1400 updates the user interface (at 1470) after applying the selected smoothing filter and sample width to all channels loaded in the NTS object in application memory. After updating the user interface, the comprehensive process for smoothing or compressing channels that are loaded in NTS object memory 1400 ends.

As noted above, the comprehensive process for smoothing or compressing channels that are loaded in NTS object memory 1400 exits the determination (at 1420) and proceeds to a series of steps for applying smoothing only to select channels of the NTS object (at 1480 and 1490) when the user does not intend to smooth all of the channels loaded in the NTS object memory ('NO'). Specifically, the comprehensive process for smoothing or compressing channels that are loaded in NTS object memory 1400 performs a step at which the user selects a smoothing filter, a sample width, and one or more channels to smooth (at 1480). The channels selected by the user are channels loaded in the NTS object in application memory, but is less than all of the channels loaded in the NTS object in application memory (and can be as little as a single channel selection). After the user has selected the smoothing filter, the sample width, and the channels, the comprehensive process for smoothing or compressing channels that are loaded in NTS object memory 1400 performs a final step for smoothing the selected NTS object data channels in application memory (at 1490) and updating the user interface accordingly. Then the comprehensive process for smoothing or compressing channels that are loaded in NTS object memory 1400 ends.

By way of another example, FIG. 15 conceptually illustrates a process for saving or exporting a file 1500. The process for saving or exporting a file 1500 of some embodiments is performed when the high-level numerical time series analysis and data simplification process 100 performs the save or export file process (at 210), described above by reference to FIG. 2. However, the process for saving or exporting a file 1500 can be launched by an independent interaction of the user to select a menu item in the user interface of the application for saving or exporting a file.

As shown in FIG. 15, the process for saving or exporting a file 1500 starts by determining (at 1510) whether to save a file or not. The file to save can be the NTS object in application memory which the user intends to save in a file (such as when exiting the application). When the user intends to save the file ('YES'), the process for saving or exporting a file 1500 transitions forward to a step at which the user enters a file name and selects a location at which to save the file (at 1540). On the other hand, when it is determined (at 1510) that the user does not intend to save the file ('NO'), the process for saving or exporting a file 1500 proceeds to another determination (at 1520) of whether to export the file or not. In some embodiments, the act of saving the file is different from the act of exporting the file. Specifically, saving the file means that the data contents of the NTS object in application memory are saved in a format native to and suitable for reloading into the application later. By contrast, exporting the file means that the data contents are converted to a format supported by one of the exportable file types that are offered through the application. Thus, when the user does not wish to export the file ('NO'), the process for saving or exporting a file 1500 ends (because the user has not expressed interest in either saving or exporting the file).

On the other hand, when the user affirmatively expresses a desire to export the file ('YES'), the process for saving or exporting a file 1500 proceeds to a step at which the user selects an exportable file type (at 1530). Specifically, the application supports one or more exportable file types that are not native to the application, but may be common file types and/or formats. After the user has selected the exportable file type, the process for saving or exporting a file 1500 performs any data conversions or updates that may be required by data formats supported by the exportable file type. That is, each exportable file type may have its own data and metadata formatting requirements. Thus, exporting the file to an exportable file type may involve converting at least some of the data and/or metadata to the format suitable for the selected exportable file type.

Next, the process for saving or exporting a file 1500 proceeds to the step at which the user enters the file name (for the 'saved file' or the 'exported file') and selects a location at which to save the file (at 1540). After the file name and location are selected, the process for saving or exporting a file 1500 writes and/or exports the NTS object data to the selected file at the selected location (at 1550). Then the process for saving or exporting a file 1500 ends.

Many of the above-described features and, specifically, the aforementioned application, are implemented as software processes (several of which are described above, by reference to FIGS. 1-15) These software processes are specified as sets of instructions recorded on a computer readable storage medium (also referred to as computer readable medium, machine readable medium, or non-transitory computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

By way of example, FIG. 16 conceptually illustrates an electronic system 1600 with which some embodiments of the invention are implemented. The electronic system 1600 may be a computer (e.g., desktop computer, laptop, single board computer, server, etc.), a mobile computing device (e.g., mobile device, smartphone, tablet computing device, PDA, etc.), or any other sort of electronic device. Such an electronic system includes various types of computer readable media and interfaces for various other types of computer readable media. The electronic system 1600 shown in this figure includes a bus 1605, processing unit(s) 1610, a system memory 1615, a read-only memory 1620, a permanent storage device 1625, input devices 1630, output devices 1635, and a network 1640.

The bus 1605 collectively represents all system, peripheral, and chipset buses that communicatively connect the numerous internal devices of the electronic system 1600. For instance, the bus 1605 communicatively connects the processing unit(s) 1610 with the read-only memory 1620, the system memory 1615, and the permanent storage device 1625.

From these various memory units, the processing unit(s) 1610 retrieves instructions to execute and data to process in order to execute the processes described above, by reference to FIGS. 1-15. The processing unit(s) may be a single processor or a multi-core processor in different embodiments.

The read-only-memory (ROM) 1620 stores static data and instructions that are needed by the processing unit(s) 1610 and other modules of the electronic system. The permanent storage device 1625, on the other hand, is a read-and-write memory device. This device is a non-volatile memory unit that stores instructions and data even when the electronic system 1600 is off. Some embodiments of the invention use a mass-storage device (such as a magnetic or optical disk and its corresponding disk drive) as the permanent storage device 1625.

Other embodiments use a removable storage device (such as a floppy disk or a flash drive) as the permanent storage device 1625. Like the permanent storage device 1625, the system memory 1615 is a read-and-write memory device. However, unlike storage device 1625, the system memory 1615 is a volatile read-and-write memory, such as a random access memory. The system memory 1615 stores some of the instructions and data that the processor needs at runtime. In some embodiments, the invention's processes are stored in the system memory 1615, the permanent storage device 1625, and/or the read-only memory 1620. For example, the NTS object is referred to in several of the examples above as being loaded in application memory, which may refer to exclusive application space in the system memory 1615 or the read-only memory 1620 during runtime processing of the application, and may even refer to persistent memory/ storage of the permanent storage device 1625 during runtime (but more normally when the application is not launched). From these various memory units, the processing unit(s) 1610 retrieves instructions to execute and data to process in order to execute the processes of some embodiments.

The bus 1605 also connects to the input and output devices 1630 and 1635. The input devices enable the user to select commands, menus, tools, etc., in the user interface of the application, and to communicate information or commands to the electronic system. The input devices 1630 include at least alphanumeric keyboards and pointing devices (also called "cursor control devices"). The output devices 1635 display the user interface for the application, graphical elements within the user interface, and may display other visual elements, such as images, data (text/ character-based information), and other visual elements generated by the electronic system 1600. The output devices 1635 commonly include printers and display devices, such as liquid crystal displays (LCD) and organic light emitting diode (OLED) displays. Some embodiments include a device, such as a touchscreen, that functions as both an input device and an output device.

Finally, as shown in FIG. 16, bus 1605 also couples electronic system 1600 to a network 1640 through a network adapter (not shown). In this manner, the application running on the computing device can be a part of a network of computers (such as a local area network ("LAN"), a wide area network ("WAN"), or an intranet), or a network of networks (such as the Internet) which are configured to share numeric time series data, NTS objects, and other aspects pertaining to the application. Any or all components of electronic system 1600 may be used in conjunction with the invention.

The above-described embodiments of the invention are presented for purposes of illustration and not of limitation. While these embodiments of the invention have been described with reference to numerous specific details, one of ordinary skill in the art will recognize that the invention can be embodied in other specific forms without departing from the spirit of the invention. For instance, the numerical time series analysis and data simplification system and process could be used to view financial data streams, environmental data streams, etc. Thus, one of ordinary skill in the art would understand that the invention is not to be limited by the foregoing illustrative details, but rather is to be defined by the appended claims.

I claim:

1. A numerical time series analysis and data simplification process for simplifying data analysis and visualization of numerical time series data from analog data acquisition (DAQ) systems, said numerical time series analysis and data simplification process comprising:

opening, by a computing device operable by a user, a software application that implements computer-readable instructions for performing a plurality of numerical time series analysis and data simplification operations;

receiving, by the computing device in connection with the software application, a user selection of a file process to engage in from a plurality of file processes comprising a first file process for a particular data file involving one of loading a file and importing a file, a second file process involving creating a new file, and a third file process involving processing an external file;

performing, by the computing device in connection with the software application, the plurality of numerical time series analysis and data simplification operations as follows:

determining whether the user selection is for the third file process involving processing the external file;

determining, when the user selection is not for the third file process, whether the user selection is for the second file process involving creating the new file;

performing a new file creation process, when the user selection is for the second file process and not for the third file process, for creating the new file, wherein the new file creation process creates the new file as an application file in a memory space of the software application, wherein creating the new file as the application file comprises creating a new numeric time series (NTS) object in the memory space of the software application, wherein the new NTS object represents the new file in application memory;

performing an existing file load/import file process when the user selection is not for the third file process and not for the second file process involving creating the new file, wherein the existing file load/import file process loads an existing file as the application file in the memory space of the software application;

determining, when the user selection is not for the third file process, whether to add channels to the application file;

adding, when at least one channel is determined to be added and the user selection is not for the third file process, a base channel and a particular channel to the application file, wherein the particular channel is different from the base channel;

navigating, when the user selection is not for the third file process, through a plurality of displayed channels and setting a channel view option for each navigated displayed channel, wherein the channel view option for each navigated displayed channel comprises one of showing the displayed channel in a user interface of the software application, hiding the displayed channel from view in the user interface of the software application, and modifying the displayed channel;

performing, when the user selection is not for the third file process, a channel operation comprising one of (i) smoothing a channel graph of a channel loaded in an NTS object in application memory and (ii) compressing the channel graph of the channel loaded in the NTS object in application memory;

performing, when the user selection is affirmatively for the third file process, a particular external file operation with respect to the external file; and closing the application file and the software application.

2. The numerical time series analysis and data simplification process of claim 1, wherein the particular external file operation comprises converting the external file.

3. The numerical time series analysis and data simplification process of claim 1, wherein the particular external file operation comprises concatenating the external file and a second external file.

4. The numerical time series analysis and data simplification process of claim 1, wherein the particular external file operation comprises splitting the external file.

5. The numerical time series analysis and data simplification process of claim 1, wherein the particular channel comprises one of an event channel and a math channel.

6. The numerical time series analysis and data simplification process of claim 5, wherein adding the base channel to the application file comprises:

receiving a user selection of a base channel simulation type configured to simulate one of a waveform from an analytical model and a waveform mask;

determining which simulation type is received;

receiving, when the simulation type is for simulating the waveform mask, channel masking selections;

adding, when the simulation type is for simulating the waveform mask and after the channel masking selections are received, the channel masking selections to the NTS object in application memory;

receiving, when the simulation type is for simulating the waveform from the analytical model, waveform simulation selections; and adding, when the simulation type is for simulating the waveform from the analytical model and after the waveform simulation selections are received, the waveform simulation selections to the NTS object in application memory.

7. The numerical time series analysis and data simplification process of claim 5, wherein the particular channel comprises a particular event channel and adding the particular channel comprises adding the particular event channel to the NTS object in application memory.

8. The numerical time series analysis and data simplification process of claim 5, wherein the particular channel comprises particular math channel and adding the particular channel comprises adding the particular math channel to the NTS object in application memory.

* * * * *